US011348451B2

(12) United States Patent
Madigan et al.

(10) Patent No.: US 11,348,451 B2
(45) Date of Patent: May 31, 2022

(54) ELECTRICAL DATA PROCESSING SYSTEM FOR DETERMINING A NAVIGATION ROUTE BASED ON THE LOCATION OF A VEHICLE AND GENERATING A RECOMMENDATION FOR A VEHICLE MANEUVER

(71) Applicant: Allstate Insurance Company, Northbrook, IL (US)

(72) Inventors: Regina Madigan, Mountain View, CA (US); Timothy W. Gibson, Barrington, IL (US); Howard Hayes, Glencoe, IL (US); Surender Kumar, Palatine, IL (US)

(73) Assignee: Allstate Insurance Company, Northbrook, IL (US)

( * ) Notice: Subject to any disclaimer, the term of this patent is extended or adjusted under 35 U.S.C. 154(b) by 168 days.

(21) Appl. No.: 16/534,415

(22) Filed: Aug. 7, 2019

(65) Prior Publication Data

US 2020/0365011 A1 Nov. 19, 2020

Related U.S. Application Data

(63) Continuation of application No. 15/249,597, filed on Aug. 29, 2016, now Pat. No. 10,417,904.

(51) Int. Cl.
*G08G 1/00* (2006.01)
*H04W 4/024* (2018.01)
(Continued)

(52) U.S. Cl.
CPC ............. *G08G 1/00* (2013.01); *H04W 4/024* (2018.02); *H04W 4/029* (2018.02); *H04W 4/38* (2018.02);
(Continued)

(58) Field of Classification Search
None
See application file for complete search history.

(56) References Cited

U.S. PATENT DOCUMENTS

| 5,031,104 A | 7/1991 | Ikeda et al. |
| 5,926,113 A | 7/1999 | Jones et al. |

(Continued)

FOREIGN PATENT DOCUMENTS

| CN | 103647953 A | 3/2014 |
| EP | 1643214 A2 | 4/2006 |

(Continued)

OTHER PUBLICATIONS

Jun. 11, 2020—U.S. Non-Final Office Action—U.S. Appl. No. 16/435,844.

(Continued)

*Primary Examiner* — Jonathan M Dager
*Assistant Examiner* — Garrett F Evans
(74) *Attorney, Agent, or Firm* — Polsinelli PC

(57) ABSTRACT

Systems and methods are disclosed for determining a navigation route based on the location of a vehicle and generating a recommendation for a vehicle maneuver. The method may comprise determining, based on sensor data received from a location sensor of a mobile device or a vehicle, a location of the vehicle. A computing device may determine a navigation route for navigating the vehicle from the location to a destination, and the navigation route may comprise a plurality of intersections. The computing device may determine a plurality of potential maneuvers at a first intersection of the plurality of intersections. The computing device may also determine, based on one or more factors, a navigation score for each of the plurality of potential maneuvers at the first intersection. Based on the navigation score for each of the plurality of potential maneuvers, the com-
(Continued)

puting device may select a maneuver from the plurality of potential maneuvers to recommend for the vehicle.

20 Claims, 7 Drawing Sheets

(51) Int. Cl.
*H04W 4/029* (2018.01)
*H04W 4/38* (2018.01)
*H04W 4/90* (2018.01)
*H04W 4/40* (2018.01)
*H04W 4/48* (2018.01)

(52) U.S. Cl.
CPC ............... *H04W 4/40* (2018.02); *H04W 4/90* (2018.02); *H04W 4/48* (2018.02)

(56) References Cited

U.S. PATENT DOCUMENTS

| | | | |
|---|---|---|---|
| 6,100,819 | A | 8/2000 | White |
| 6,111,523 | A | 8/2000 | Mee |
| 6,415,226 | B1 | 7/2002 | Kozak |
| 6,463,900 | B1 | 10/2002 | Wakabayashi et al. |
| 7,113,108 | B1 | 9/2006 | Bachelder et al. |
| 7,317,406 | B2 | 1/2008 | Wolterman |
| 7,327,280 | B2 | 2/2008 | Bachelder et al. |
| 7,647,180 | B2 | 1/2010 | Breed |
| 8,031,062 | B2 | 10/2011 | Smith |
| 8,576,069 | B2 | 11/2013 | Nadeem et al. |
| 8,606,512 | B1 | 12/2013 | Bogovich et al. |
| 9,047,778 | B1 | 6/2015 | Cazanas et al. |
| 9,048,960 | B2 | 6/2015 | Li et al. |
| 9,365,213 | B2 | 6/2016 | Stenneth et al. |
| 10,127,812 | B2 | 11/2018 | Madigan et al. |
| 10,366,606 | B2 | 7/2019 | Madigan et al. |
| 2005/0184860 | A1 | 8/2005 | Taruki et al. |
| 2005/0187701 | A1 | 8/2005 | Baney |
| 2006/0074553 | A1 | 4/2006 | Foo et al. |
| 2009/0174573 | A1 | 7/2009 | Smith |
| 2009/0224931 | A1 | 9/2009 | Dietz et al. |
| 2011/0018701 | A1 | 1/2011 | Mizuno |
| 2011/0161119 | A1 | 6/2011 | Collins |
| 2011/0213628 | A1 | 9/2011 | Peak et al. |
| 2011/0246051 | A1 | 10/2011 | Vang et al. |
| 2011/0269441 | A1 | 11/2011 | Silver |
| 2012/0083995 | A1 | 4/2012 | Vorona |
| 2012/0191343 | A1 | 7/2012 | Haleem |
| 2012/0310465 | A1 | 12/2012 | Boatright et al. |
| 2013/0162449 | A1 | 6/2013 | Ginsberg |
| 2013/0178234 | A1 | 7/2013 | Jones et al. |
| 2013/0219047 | A1 | 8/2013 | Weismiller et al. |
| 2013/0222154 | A1 | 8/2013 | Mori et al. |
| 2014/0214259 | A1 | 7/2014 | Trepagnier et al. |
| 2014/0222280 | A1 | 8/2014 | Salomonsson et al. |
| 2014/0303882 | A1* | 10/2014 | Jang ............... G08G 1/096783 701/119 |
| 2015/0035685 | A1 | 2/2015 | Strickland et al. |
| 2015/0110344 | A1 | 4/2015 | Okumura |
| 2015/0166059 | A1 | 6/2015 | Ko |
| 2015/0235557 | A1 | 8/2015 | Engelman et al. |
| 2015/0363886 | A1 | 12/2015 | Fernandes et al. |
| 2016/0086391 | A1 | 3/2016 | Ricci |
| 2016/0161271 | A1 | 6/2016 | Okumura |
| 2016/0176398 | A1 | 6/2016 | Prokhorov et al. |
| 2016/0231746 | A1 | 8/2016 | Hazelton et al. |
| 2016/0379485 | A1 | 12/2016 | Anastassov et al. |
| 2017/0050638 | A1 | 2/2017 | Gordon et al. |
| 2017/0123421 | A1* | 5/2017 | Kentley ............... G06Q 10/00 |
| 2017/0213458 | A1 | 7/2017 | Gordon et al. |
| 2018/0184288 | A1 | 6/2018 | De Lorenzo et al. |

FOREIGN PATENT DOCUMENTS

| | | |
|---|---|---|
| EP | 2479538 A2 | 7/2012 |
| KR | 20110058279 A | 6/2011 |
| WO | 2015040634 A2 | 3/2015 |

OTHER PUBLICATIONS

Jun. 26, 2020—(EP) Extended Search Report—App. No. 17847302.
Jun. 30, 2020—U.S. Non-Final Office Action—U.S. Appl. No. 16/671,403.
Jul. 29, 2019—U.S. Notice of Allowance—U.S. Appl. No. 15/249,536.
Jan. 8, 2020—U.S. Notice of Allowance—U.S. Appl. No. 16/435,844.
Feb. 7, 2020—(CA) Office Action—App. No. 3,034,441.
Mar. 23, 2020—(EP) Partial Search Report—App. No. 17847302.
"Way to Green: Intelligent Traffic Control with Vanet;" International Journal of Computer Engineering & Technology (IJCET); vol. 5, Issue 12, Dec. 2014, pp. 99-104.
"AGT and Cisco's Smart Intersection Leverages IoT Edge Analytics to Improve Road Safety and Traffic Management;" AGT Web Team; Oct. 14, 2014; https://www.agtinternational.com/agt-and-ciscos-smart-intersection-leverages-iot-edge-analytics-to-improve-road-safety-and-traffic-management/.
Klein, Lawrence A., "Final Report: Mobile Surveillance and Wireless Communication Systems Field Operational Test;" vol. 2: FOT Objectives, Organization, System Design, Results, Conclusion, and Recommendations; California PATH Research Report; Mar. 1999.
Koumoullos, Michael G. et al., "The S.M.A.R.T. Intersection—Integrating Infrared Sensors with a Microcontroller: Automated Regulation of Traffic Flow;" Science and Mechatronics Aided Research for Teachers 2004; Aug. 2004.
Oct. 13, 2017—U.S. Office Action—U.S. Appl. No. 15/249,597.
Nov. 20, 2017—(WO) International Search Report—PCT/US17/048882.
Jan. 12, 2018—U.S. Non-Final Office Action—U.S. Appl. No. 15/249,556.
May 17, 2018—U.S. Final Office Action—U.S. Appl. No. 15/249,597.
Jun. 26, 2018—U.S. Notice of Allowance—U.S. Appl. No. 15/249,556.
Jul. 5, 2018—U.S. Non-Final Office Action—U.S. Appl. No. 15/249,536.
Oct. 5, 2018—U.S. Office Action—U.S. Appl. No. 15/249,597.
Nov. 30, 2018—U.S. Office Action—U.S. Appl. No. 16/142,163.
Jan. 14, 2019—U.S. Final Office Action—U.S. Appl. No. 15/249,536.
Mar. 15, 2019—U.S. Notice of Allowance—U.S. Appl. No. 16/142,163.
May 8, 2019—U.S. Notice of Allowance—U.S. Appl. No. 15/249,597.
Oct. 19, 2020—U.S. Notice of Allowance—U.S. Appl. No. 16/671,403.
Dec. 3, 2020—(CA) Office Action—App. No. 3034441.
Dec. 17, 2020—U.S. Final Office Action—U.S. Appl. No. 16/435,844.
Sep. 18, 2020—U.S. Non-Final Office Action—U.S. Appl. No. 16/821,078.
Jan. 15, 2021—U.S. Notice of Allowance—U.S. Appl. No. 16/671,403.
Mar. 4, 2021—U.S. Non-Final Office Action—U.S. Appl. No. 16/821,078.

* cited by examiner

ELECTRICAL DATA PROCESSING SYSTEM FOR DETERMINING A NAVIGATION ROUTE BASED ON THE LOCATION OF A VEHICLE AND GENERATING A RECOMMENDATION FOR A VEHICLE MANEUVER

CROSS-REFERENCE TO RELATED-APPLICATIONS

This application is a continuation of U.S. application Ser. No. 15/249,597, filed Aug. 29, 2016. This application is incorporated by reference in its entirety.

TECHNICAL FIELD

Aspects of the disclosure generally relate to an electrical data processing system for determining the status of a traffic device and vehicle movement, monitoring or affecting movement of a vehicle using a traffic device, and/or determining a navigation route based on the location of a vehicle and/or generating a recommendation for a vehicle maneuver.

BACKGROUND

Traffic accidents and other unsafe conditions on or affecting roads is surprisingly common. Drivers, pedestrians, bicyclists, and other parties often rely on their own abilities to avoid accidents and unsafe conditions. However, conditions for these individuals may be made even safer using certain traffic infrastructure, vehicle capabilities, and mobile device capabilities, many of which currently are not being utilized.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to a system comprising a traffic device having a traffic device computer, one or more traffic signals, and/or a transceiver. The system may comprise first memory storing computer-executable instructions that, when executed by the traffic device computer, cause the traffic device to transmit, via the transceiver and to a vehicle and infrastructure computing device, information indicative of a status of the one or more traffic signals. The vehicle and infrastructure computing device may comprise a vehicle and infrastructure control computer and/or second memory storing computer-executable instructions that, when executed by the vehicle and infrastructure control computer, cause the vehicle and infrastructure computing device to receive, from the traffic device, the information indicative of the status of the one or more traffic signals. The computing device may determine that the information indicative of the status of the one or more traffic signals indicates that the one or more traffic signals of the traffic device switched from a red light to a green light and a time that the one or more traffic signals of the traffic device switched from the red light to the green light. In response to determining that the one or more traffic signals of the traffic device switched from the red light to the green light, the computing device may determine an amount of time between the time that the one or more traffic signals of the traffic device switched from the red light to the green light and a time that a vehicle at a location of the traffic device moved. In response to determining that the amount of time exceeds a threshold amount of time, the computing device may determine that a driver of the vehicle is distracted.

In some aspects, the system may comprise a traffic camera. The vehicle and infrastructure computing device may receive, from the traffic camera, one or more images of the vehicle captured by the traffic camera. Based on the one or more images of the vehicle captured by the traffic camera, the computing device may determine the time that the vehicle at the location of the traffic device moved. Additionally or alternatively, the system may comprise a mobile device having one or more of a position sensor, speed sensor, or acceleration sensor. The computing device may receive, from the mobile device or the vehicle, data indicative of one or more of a position, speed, or acceleration of the vehicle. Based on the data indicative of one or more of the position, speed, or acceleration of the vehicle, the computing device may determine the time that the vehicle at the location of the traffic device moved.

In some aspects, the vehicle and infrastructure computing device may determine that the vehicle is at the location of the traffic device and that the one or more traffic signals of the traffic device is not red. In response to determining that the vehicle is at the location of the traffic device and that the one or more traffic signals of the traffic device is not red, the computing device may send an instruction to one or more mobile device of the driver to prevent driver interaction with the mobile device while the one or more traffic signals of the traffic device is not red. The instruction may be configured to disable one or more applications of the mobile device, such as a messaging application.

In some aspects, the vehicle and infrastructure computing device may determine that the vehicle is at the location of the traffic device and that the one or more traffic signals of the traffic device is red. In response to determining that the vehicle is at the location of the traffic device and that the one or more traffic signals of the traffic device is red, the computing device may send an instruction to one or more mobile device of the driver to enable use of the mobile device while the one or more traffic signals of the traffic device is red. The vehicle and infrastructure computing device may determine that the one or more traffic signals of the traffic device switched from red to green. In response to determining that the one or more traffic signals of the traffic device switched from red to green, the computing device may send an instruction to the one or more mobile device of the driver to prevent driver interaction with the mobile device while the one or more traffic signals of the traffic device is green.

In some aspects, the vehicle and infrastructure computing device may adjust a risk score for the driver based on determining that the driver of the vehicle is distracted. Additionally or alternatively, the vehicle and infrastructure computing device may, in response to determining that the one or more traffic signals of the traffic device has switched from the red light to the green light, send an instruction to one or more mobile device of the driver or to the vehicle to display an indication to the driver that the one or more traffic signals is a green light. The instruction may cause the mobile device to audibly or visually notify the driver that the one or more traffic signals is green.

Aspects of the disclosure relate to a system comprising an event data source having a processor and/or a transceiver.

The system may comprise first memory storing computer-executable instructions that, when executed by the processor, cause the event data source to transmit, via the transceiver and to a vehicle and infrastructure computing device, information indicative of an event affecting a portion of road. The vehicle and infrastructure computing device may comprise a vehicle and infrastructure control computer and/or second memory storing computer-executable instructions that, when executed by the vehicle and infrastructure control computer, cause the vehicle and infrastructure computing device to receive, from the event data source, the information indicative of the event affecting the portion of road. The computing device may determine one or more traffic devices associated with the portion of road and configured to control traffic for the portion of road. Based on the information indicative of the event affecting the portion of road, the computing device may send, to the one or more traffic devices associated with the portion of road, instructions to change one or more characteristics of the one or more traffic devices.

In some aspects, the one or more traffic devices may comprise a traffic light having a plurality of lights. Moreover, the one or more characteristics of the traffic light may comprise a timing of the plurality of lights. Additionally or alternatively, the one or more traffic devices may comprise a speed limit display. The one or more characteristics of the speed limit display may comprise a speed limit displayed on the speed limit display.

In some aspects, the information indicative of the event affecting the portion of road may comprise time information and information indicative of an estimate of a number of pedestrians associated with the event affecting the portion of road. The information indicative of the event may be accessible from an electronic calendar. The portion of road may comprise an intersection. Moreover, the information indicative of the event affecting the intersection may indicate that a number of pedestrians at the intersection will exceed a threshold number of pedestrians.

In some aspects, the event may comprise an accident involving one or more vehicles affecting traffic flow through the portion of road. The one or more traffic devices may comprise one or more of a traffic light or a speed limit display. The instructions to change one or more characteristics of the one or more traffic devices may comprise one or more of instructions to increase a frequency of red lights at the traffic light or instructions to decrease a speed limit displayed on the speed limit display.

In some aspects, based on the information indicative of the event affecting the portion of road, the computing device may send, to one or more autonomous vehicles, instructions to take one or more actions in response to the event. The instructions to take one or more actions may comprise an instruction for the autonomous vehicle to apply brakes, an instruction for the autonomous vehicle to slow down, or an instruction for the autonomous vehicle to speed up.

In some aspects, the system may comprise a pedestrian barrier associated with the portion of road. The vehicle and infrastructure computing device may, based on the information indicative of the event affecting the portion of road, send, to the pedestrian barrier, instructions to activate the pedestrian barrier to prevent pedestrians from entering the portion of road. Additionally or alternatively, the vehicle and infrastructure computing device may, based on the information indicative of the event affecting the portion of road, send, to a mobile device of a pedestrian located proximate the portion of road, instructions for the mobile device to audibly or visually notify the pedestrian of the event affecting the portion of road.

Aspects of the disclosure relate to a method comprising determining, based on sensor data received from a location sensor of a mobile device or a vehicle, a location of the vehicle. A computing device may determine a navigation route for navigating the vehicle from the location to a destination, and the navigation route may comprise a plurality of intersections. The computing device may determine a plurality of potential maneuvers at a first intersection of the plurality of intersections. The computing device may also determine, based on one or more factors, a navigation score for each of the plurality of potential maneuvers at the first intersection. Based on the navigation score for each of the plurality of potential maneuvers, the computing device may select a maneuver from the plurality of potential maneuvers to recommend for the vehicle.

In some aspects, the computing device may be at a location remote from the location of the vehicle. The method may comprise wireless transmitting, by the computing device, the selected maneuver to a navigation application associated with one or more of the mobile device or the vehicle. Additionally or alternatively, the one or more factors may comprise a level of autonomy of the vehicle. Determining the navigation score for each of the plurality of potential maneuvers may comprise determining the navigation score for each of the plurality of potential maneuvers based on the level of autonomy of the vehicle.

In some aspects, the vehicle may comprise an autonomous vehicle, and the method may further comprise sending the selected maneuver to the autonomous vehicle. Additionally or alternatively, the vehicle may have a plurality of autonomous features activated. The computing device may receive, from one or more of the vehicle or mobile device, data indicating that the vehicle is approaching the first intersection. In response to receiving the data indicating that the vehicle is approaching the first intersection, an instruction to deactivate one or more of the plurality of autonomous features may be sent to the vehicle. One or more factors may comprise whether the vehicle is autonomous, and the method may further comprise determining, by the computing device, whether the vehicle is autonomous. Selecting the maneuver may comprise selecting a first maneuver to recommend if the vehicle is autonomous and selecting a second maneuver to recommend if the vehicle is not autonomous.

In some aspects, the plurality of potential maneuvers at the first intersection may comprise at least two of a right turn at the first intersection, a left turn at the first intersection, a U turn at the first intersection, and proceeding straight through the first intersection. In some aspects, the computing device may determine an intersection score for each of the plurality of intersections based on one or more of a complexity of the intersection, a number of accidents at the intersection, weather, or traffic congestion.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
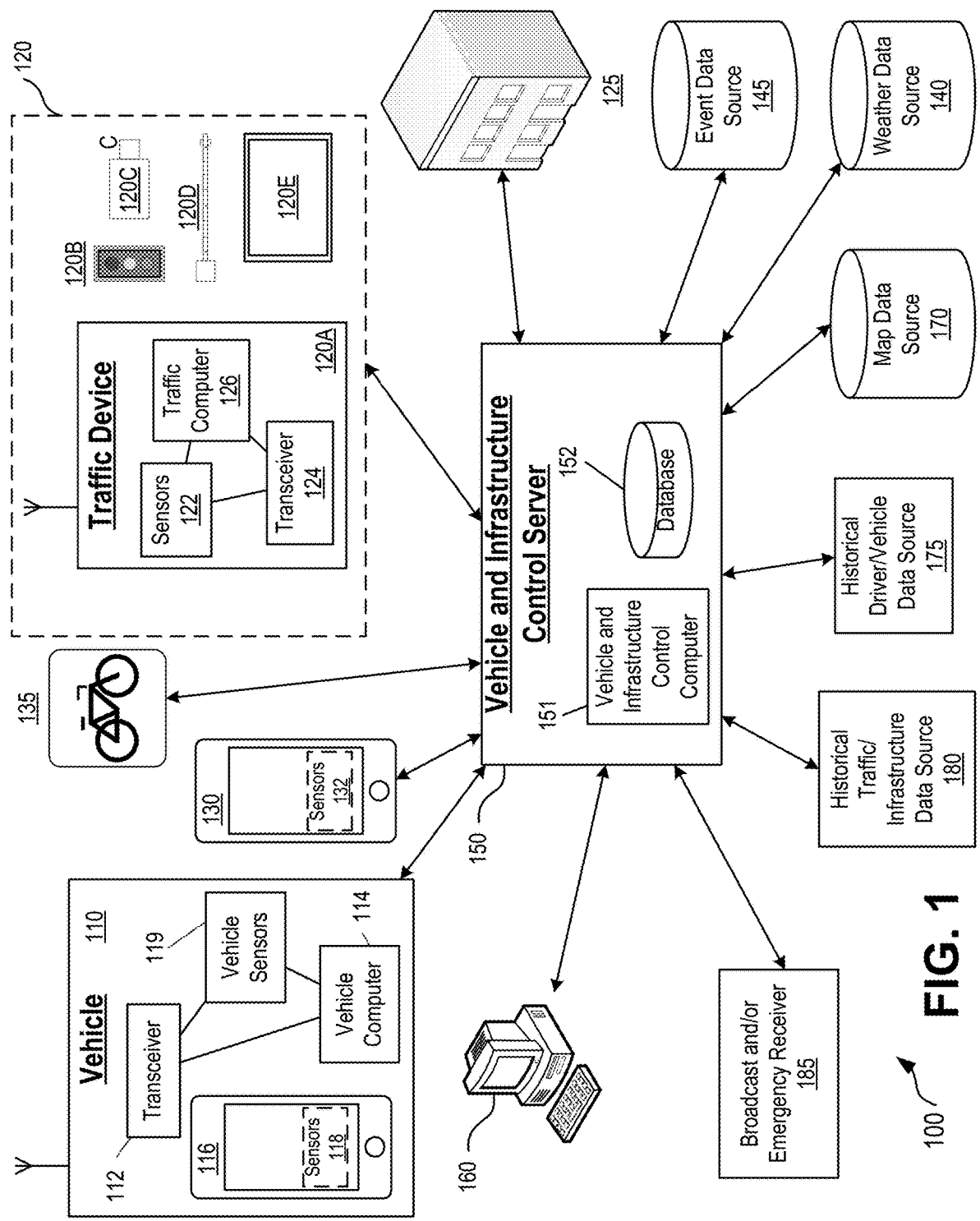
FIG. 1 is a diagram illustrating various example components of a vehicle and infrastructure control system according to one or more aspects of the disclosure.

FIG. 1 is a diagram illustrating various example components of a vehicle and infrastructure control system 100 according to one or more aspects of the disclosure. The vehicle and infrastructure control system 100 may include a vehicle 110, other vehicles (not illustrated in FIG. 1), one or more traffic devices (e.g., traffic or roadway infrastructure devices) in a traffic device network or system 120, one or more mobile devices 130 (e.g., a mobile device of a pedestrian or a bicyclist), one or more bicycles 135, one or more buildings 125, one or more weather data source 140, one or more event data source 145, one or more map data source 170, one or more historical driver or vehicle data source 175, one or more historical traffic or infrastructure data source 180, one or more broadcast and/or emergency receiver 185, a vehicle and infrastructure control server 150, and additional related components. Each component of the vehicle and infrastructure control system 100 may include a computing device (or system) having some or all of the following structural components.

For example, the vehicle and infrastructure control computer or computing device 151 may have a processor for controlling overall operation of the computing device 151 and its associated components, including RAM, ROM, input/output module, and memory. The computing device 151, along with one or more additional devices (e.g., vehicle 110, traffic device in the traffic device system or network 120, mobile device 130, bicycle 135, building 125, weather data source 140, etc.), may correspond to any of multiple systems or devices, such as vehicle and infrastructure control computing devices or systems, configured as described herein for determining the status of a traffic device and vehicle movement, monitoring or affecting movement of a vehicle using a traffic device, or determining a navigation route based on the location of a vehicle and generating a recommendation for a vehicle maneuver.

Sensor data can include data collected from mobile devices (e.g., a driver's mobile phone, a passenger's mobile phone, a pedestrian's mobile phone), vehicle sensors, on-board diagnostic (OBD) systems, sensors on traffic devices (e.g., traffic cameras, etc.), off the shelf devices, or any other devices as will be described in further detail below. Sensor data may refer to information pertaining to one or more actions or events performed or observed by a vehicle, a pedestrian, traffic devices, or any other devices and can include aspects of information identified or determined from data collected from a vehicle, a stationary device, or a mobile device. Sensor data can include, for example, location data, speed or velocity data, acceleration data, braking data, turning or swerving data, image data, presence data, time data, direction data, mobile device orientation data, rotation/gyroscopic data, weather data, vehicle condition data, and the like.

The vehicle and infrastructure control computer 151 may include an Input/Output (I/O) module having a microphone, keypad, touch screen, and/or stylus through which a user of the computing device 151 may provide input, and may also include one or more of a speaker for providing audio input/output and a video display device for providing textual, audiovisual and/or graphical output. Software may be stored within the memory of the vehicle and infrastructure control computer and/or other storage to provide instructions to its processor for enabling device 151 to perform various functions. For example, the computing device's memory may store software used by the device 151, such as an operating system, application programs, and an associated internal or external database 151. The memory unit may include one or more of volatile and/or non-volatile computer memory to store computer-executable instructions, data, and/or other information. The processor of the computer 151 and its associated components may allow the vehicle and infrastructure control computer 151 to execute a series of computer-readable instructions to determine the status of a traffic device and vehicle movement, monitor or affect movement of a vehicle using a traffic device, or determine a navigation route based on the location of a vehicle and generating a recommendation for a vehicle maneuver. One or more application programs used by the vehicle and infrastructure control computing device 151 may include computer executable instructions for determining the status of a traffic device and vehicle movement, monitoring or affecting movement of a vehicle using a traffic device, or determining a navigation route based on the location of a vehicle and generating a recommendation for a vehicle maneuver and performing other related functions as described herein.

The vehicle and infrastructure control computing device 151 may operate in a networked environment supporting connections to one or more remote computers, such as various other terminals/devices (e.g., terminal 160, which may include a display). The vehicle and infrastructure control computing device 151, and the related terminals/devices, may communicate with devices installed in vehicles, mobile devices that may travel within vehicles, or devices outside of vehicles that are configured to receive and process vehicle data, pedestrian data, and other sensor data. Thus, the vehicle and infrastructure control computing device 151 and its associated terminals/devices may each include personal computers (e.g., laptop, desktop, or tablet computers) and/or servers (e.g., web servers, database servers) and may communicate with vehicle-based devices (e.g., on-board vehicle computers, short-range vehicle communication systems, sensor and telematics devices), or mobile communication devices (e.g., mobile phones, portable computing devices, and the like). The vehicle and infrastructure control server 150 (and/or its components) may be able to indicate its health to other systems (and/or their components) interfacing with the server 150.

The devices illustrated in system 100 may communicate via network connections depicted such as a local area network (LAN) and a wide area network (WAN), and a wireless telecommunications network, but may also include other networks. When used in a LAN networking environment, the vehicle and infrastructure control computing device 151 may be connected to the LAN through a network interface or adapter. When used in a WAN networking environment, the device 151 may include a modem or other means for establishing communications over the WAN, such as a network (e.g., the Internet). When used in a wireless telecommunications network, the device 151 may include one or more transceivers, digital signal processors, and additional circuitry and software for communicating with wireless computing devices (e.g., mobile phones, short-range vehicle communication systems, vehicle sensing and telematics devices) via one or more network devices (e.g., base transceiver stations) in the wireless network. It will be appreciated that the network connections shown and described above are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and vehicle and infrastructure control system components described herein may be configured to communicate using any of these network protocols or technologies. The communications between the devices illustrated in system 100 (including communications between the vehicle and infrastructure control server 150 and other devices) may be secured, such as via Transport Layer Security (TLS), Secure Sockets Layer (SSL), or any other cryptographic protocols for securing communications.

The vehicle 110 may be, for example, an automobile, motorcycle, scooter, bus, recreational vehicle, boat, or other vehicle for which sensor data may be collected and analyzed. A mobile computing device 116 within the vehicle 110 may be used to collect sensor data (e.g., via sensors 118) and/or to receive sensor data from the vehicle 110 (e.g., via vehicle sensors 119). The mobile device 116 may process the data to detect one or more conditions involving the vehicle 110 and/or transmit the sensor data to the vehicle and infrastructure control server 150 or other external computing devices. Mobile computing device 116 may be, for example, mobile phones, personal digital assistants (PDAs), tablet computers, laptop computers, smartwatches, and other devices that may be carried by drivers or passengers inside or outside of the vehicle 110.

The mobile computing device 116 may contain some or all of the hardware/software components of the computing device 151 described above. Software applications may be installed on and execute on the mobile device 116. The software applications may be configured to receive sensor data from internal sensors 118, such as acceleration, velocity, location, and the like and/or communicate with vehicle sensors 119 or other vehicle communication systems to sense or receive sensor data. For example, mobile device 116 equipped with Global Positioning System (GPS) functionality may determine vehicle location, speed, direction and other basic driving data without needing to communicate with vehicle sensors or external vehicle systems. The mobile software application may also receive sensor data from a wearable device, such as a smartwatch or a fitness band. In other examples, the software application on the mobile device 116 may be configured to receive some or all of the sensed data collected by sensors 119 of the vehicle 110.

When mobile computing device 116 within the vehicle 110 is used to sense vehicle data, the mobile computing device 116 may store, analyze, and/or transmit the vehicle data to one or more other computing devices. For example, mobile device 116 may transmit vehicle data directly to vehicle and infrastructure control server 150, and thus may be used instead of sensors or communication systems of the vehicle 110.

The mobile device 116 may include various sensors 118 capable of detecting and recording conditions at and operational parameters of the vehicle 110 if the mobile device 116 is inside the vehicle. The sensors 118 may be used to sense, for example, the location of the mobile device 116, such as the GPS coordinates (e.g., latitude and longitude). The location of the mobile device 116 may also be determined based on wireless networks the mobile device has connected to, such as Wi-Fi networks, cellular networks, and the like.

The sensors 118 of the mobile device 116, such as a GPS and/or a compass, may sense the speed and/or direction at which the mobile device 116 and accordingly vehicle 110 is traveling. An accelerometer of the mobile device 116 may sense the acceleration of the mobile device. A gyroscope may be used to determine the orientation of the mobile device. The gyroscope may also be used to measure the speed of rotation of the mobile device 116. A magnetometer may be used to measure the strength and direction of the magnetic field relative to the mobile device. The sensors 118 may comprise an image sensor (e.g., a camera), an audio sensor (e.g., a microphone), a presence sensor, etc. The sensors 118 previously described are exemplary, and the mobile device 116 may include any other sensors used for vehicle and infrastructure control.

The data collected by the mobile device 116 may be stored and/or analyzed within the mobile device 116. The processing components of the mobile computing device 116 may be used to analyze sensor data, determine the status of a traffic device and vehicle movement, monitor or affect movement of a vehicle using a traffic device, or determine a navigation route based on the location of a vehicle and generate a recommendation for a vehicle maneuver. Additionally or alternatively, the mobile device 116 may transmit, via a wired or wireless transmission network, the data to one or more external devices for storage or analysis, such as vehicle computer 114 or vehicle and infrastructure control server 150. In other words, mobile computing device 116 may be used in conjunction with, or in place of, the vehicle computer 114 or vehicle and infrastructure control server 150 to determine how to control vehicles and infrastructure.

The vehicle computer 114 of the vehicle 110 may contain some or all of the hardware/software components of the computing device 151 described above. The vehicle computer 114 may receive sensor data from the mobile device 116 and/or from sensors 119 built into the vehicle 110. For example, vehicle computer 114 may receive telematics data from the mobile device 116 or a telematics device in the vehicle 110 when the vehicle 110 is approaching an intersection or another portion of a road, such as when the vehicle 110 is a threshold distance from the intersection or other portion of road. Sensors 119 may include, for example, telematics devices integrated with the vehicle and/or aftermarket telematics devices. The telematics devices may be used to track location (e.g., via a GPS location point or GPS trail), vehicle diagnostics, speed, acceleration, and the like. The telematics devices may comprise a microphone used to collect audio data. In some aspects, the aftermarket telematics devices may be connected to the vehicle by wire, such as via the vehicle's OBD port. Aftermarket devices may additionally or alternatively connect to the vehicle (or other devices within the vehicle, such as a mobile device) wirelessly.

The vehicle computer 114 may act as a gateway device between the mobile device 116 and the vehicle and infrastructure control server 150. For example, the vehicle computer 114 may receive sensor data from the mobile device 116 and forward the received data to the vehicle and infrastructure control server 150. The vehicle 110 may include a short-range communication system 112, which will be described in further detail below. While one vehicle is illustrated in FIG. 1, any number of vehicles (and their computing devices, sensors, and mobile devices) may be used for vehicle and infrastructure control. Moreover, sensor data may be collected from one or more moving vehicles, one or more parked vehicles, or a combination of moving and parked vehicles.

The transceiver 112 may comprise or be part of a short-range communication system, such as a vehicle-based data transmission system configured to transmit vehicle data to other nearby vehicles, and to receive vehicle data from other nearby vehicles. In some examples, the transceiver 112 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, the communication system 112 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces.

The vehicle-to-vehicle (V2V) transmissions between the communication system 112 and another vehicle's communication system may be sent via DSRC, Bluetooth, satellite, GSM infrared, IEEE 802.11, WiMAX, RFID, and/or any suitable wireless communication media, standards, and protocols. In certain systems, the communication system 112 may include specialized hardware installed in vehicle 110 (e.g., transceivers, antennas, etc.), while in other examples the communication system 112 may be implemented using existing vehicle hardware components (e.g., radio and satellite equipment, navigation computers) or may be implemented by software running on the mobile device 116 of drivers and passengers within the vehicle 110.

The range of V2V communications between vehicle communication systems may depend on the wireless communication standards and protocols used, the transmission/reception hardware (e.g., transceivers, power sources, antennas), and other factors. Short-range V2V communications may range from just a few feet to many miles. V2V communications also may include vehicle-to-infrastructure (V2I) or vehicle-to-everything (V2X) communications, such as transmissions from vehicles to non-vehicle receiving devices, for example, toll booths, rail road crossings, roadside traffic monitoring devices, or generally to one or more traffic device in a traffic device system or network 120. Certain V2V communication systems may periodically broadcast data from a vehicle 110 to any other vehicle, or other infrastructure device capable of receiving the communication, within the range of the vehicle's transmission capabilities. For example, a vehicle 110 may periodically broadcast (e.g., every 0.1 second, every 0.5 seconds, every second, every 5 seconds, etc.) certain vehicle data via its short-range communication system 112, regardless of whether or not any other vehicles or reception devices are in range. In other examples, a vehicle communication system 112 may first detect nearby vehicles and receiving devices, and may initialize communication with each by performing a handshaking transaction before beginning to transmit its vehicle data to the other vehicles and/or devices. The mobile device 116 may similarly broadcast data to a vehicle, infrastructure, another mobile device, or any other computing devices periodically or when the mobile device 116 detects other vehicles or receiving devices.

The types of vehicle data transmitted by the vehicle 110 may depend on the protocols and standards used for the V2V communication, the range of communications, whether to initiate vehicle and infrastructure control, and other factors. In certain examples, the vehicle 110 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 110 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, windshield wipers, etc.). Vehicle warnings such as detection by the vehicle's 110 internal systems that the vehicle is skidding, that an impact has occurred, or that the vehicle's airbags have been deployed, also may be transmitted in V2V communications.

The mobile computing device 116 may be used instead of, or in conjunction with, the communication system 112. For example, the mobile device 116 may communicate directly with the other vehicle or directly with another mobile device, which may be inside or outside of the other vehicle. Additionally or alternatively, the other vehicle may communicate location information to vehicle 110, and vehicle 110 may in turn communicate this location information to the mobile device 116. Any data collected by any vehicle sensor or mobile device 116 sensor may be transmitted via V2V or other communication to other nearby vehicles, mobile devices, or infrastructure devices receiving V2V communications from communication system 112 or communications directly from mobile device 116. Further, additional vehicle driving data not from the vehicle's sensors (e.g., vehicle make/model/year information, driver information, etc.) may be collected from other data sources, such as a driver's or passenger's mobile device 116, vehicle and infrastructure control server 150, and/or another external computer system, and transmitted using V2V communications to nearby vehicles and other transmitting and receiving devices using communication system 112.

The system 100 may also include a traffic device 120A, containing some or all of the hardware/software components of the computing device 151 described above. The traffic device 120A may comprise one or more sensors 122, such as image sensors (e.g., cameras or other sensors used to detect the presence and/or proximity of one or more vehicles, bicycles, pedestrians, and the like), location sensors (e.g., GPS or other location sensors), audio sensors (e.g., microphones, which may be used to detect car crashes, approaching emergency vehicles, and the like), etc. The traffic device 120A may also have time data, such as from a clock, and may transmit the time data to the vehicle and infrastructure control server 150 with or separate from the sensor data. The vehicle and infrastructure control server 150 may also receive time data from any other sources, such as an atomic clock.

The traffic device 120A may comprise a traffic light 120B (e.g., at an intersection of roads), which may determine and store time and status data, such as whether the traffic light was red, yellow, or green at each point in time. The traffic light 120B may have any of the sensors described herein, including image sensors, location sensors, audio sensors, and the like. The traffic device 120A may also comprise, for example, a traffic camera 120C on the road (e.g., a stand-alone camera, a camera integrated in a traffic light, and the like) or a traffic camera in the air (e.g., a camera on a drone, a helicopter, an airplane, or any other aerial vehicle, whether manned or unmanned). The traffic camera 120C may be used to capture images of vehicles, bicycles, and/or pedestrians passing the traffic camera. The traffic device 120A may also comprise a traffic counter, such as magnetic strips, configured to count traffic flow (e.g., number and/or frequency of vehicles, bicycles, pedestrians, etc. passing by the traffic device 120A). The traffic flow data may be used to determine the ratio of accidents to the number of vehicles passing by the traffic device 120A, such as passing through a traffic light 120B.

The traffic device 120A may include sensors to detect the condition of a segment of road, such as water (e.g., standing water or water flow), ice (e.g., ice buildup, the presence of black ice, etc.), precipitation (e.g., the amount of snow on the road or the start of snowfall or rainfall), and the like. With (or separately from) the condition information, the traffic device 120A may also transmit what type of infrastructure it is, such as a bridge, a ramp, a hill, an intersection, etc. The traffic device 120A may comprise any other type of traffic or street infrastructure, such as a tollbooth, a streetlight, or pedestrian/bicycle crosswalk infrastructure. For example, the streetlight may communicate with the vehicle and infrastructure control server 150 or any other computing devices if the streetlight is out or dim. As another example, the pedestrian/bicycle crosswalk infrastructure may include a button that the pedestrian or bicyclist can press to cross the street, and a press of the button may indicate the presence of a pedestrian or bicyclist. The pedestrian/bicycle crosswalk infrastructure may also include a barrier 120D, which may prevent or allow pedestrians or bicycles from crossing the street (e.g., by raising or lowering the barrier 120D). The traffic device 120A may comprise a display device 120E (e.g., an LCD or LED display device) configured to display, for example, the speed limit, messages, or any other graphics or texts. The traffic device 120A may also comprise a transceiver 124 for transmitting and receiving data, and a traffic computer 126 used to process data and to determine data to send to the vehicle and infrastructure control server 150.

The system 100 may include one or more mobile computing device 130, which may be similar to mobile computing device 116, except that the mobile computing device 130 may be outside of a vehicle (e.g., a pedestrian's mobile device, a bicyclist's 135 mobile device, or any other mobile device). The mobile computing device 130 may contain some or all of the hardware/software components of the computing device 151 described above. Software applications executing on the mobile device 130 may be configured to receive sensor data from sensors 132, such as acceleration, velocity, location, and the like. The location of the mobile device 130 may be determined based on wireless networks the mobile device has connected to, such as Wi-Fi networks, cellular networks, GPS, and the like. As described above, the sensors 132 may also comprise a compass, an accelerometer, a gyroscope, a magnetometer, or any other type of sensor. The mobile computing device 130 may also comprise other mobile devices or accessories, such as a wearable (e.g., a smartwatch).

The system 100 may comprise one or more buildings 125 used to accommodate large numbers of people, such as schools, restaurants, stadiums, office buildings, concert halls, auditoriums, and the like. Each building 125 may have one or more of the sensors described above for the traffic device 120, or one or more of the sensors may be located close to the building 125, such as in front of or behind the building 125. For example, the building 125 may include a camera, which may be used to capture images of passing vehicles, pedestrians, and/or bicycles. The building 125 may have an associated database that stores event information (e.g., time of event, duration of event, location of event, number of people for the event, etc.) that may affect traffic patterns. For example, if the building 125 is a school, one event may be school letting out at 3:45 PM, which means more children may be crossing streets near the school. If the building 125 is a sports venue, one event may be the beginning of the sports event at 7:05 PM or the end of the sports event at 11:10 PM. Additionally or alternatively, the building 125 may use one or more of its sensors to detect an event. For example, a school may use an audio sensor to detect a ringing bell, which may indicate that the school just let the students out. As another example, the sports venue may include a camera or a pressure sensor on the ground which may detect the number or density of pedestrians. A large number or density of pedestrians may indicate that the sports event just began or just ended. As will be described in further detail below, the building 125 and/or its associated database may send sensor or event information to the vehicle and infrastructure control server 150, and the server 150 may use this information to adjust traffic patterns, such as rerouting traffic away from the vicinity of the building 125, adjusting the frequency of red lights (e.g., more frequent red lights to give pedestrians more opportunities to cross), lowering the speed limit, and the like.

The system 100 may comprise one or more event data sources 145. The event data source 145 may store event information for a building 125, as described above. The event data source 145 may generally store event information from one or more calendars (e.g., electronic calendars), such as the event's start time, end time, duration, location (e.g., at or near building 125, an intersection, another segment of road, etc.), type (e.g., sports event, school letting out, or another event resulting in a high number of pedestrians on or near streets), the expected number of people for the event (e.g., the number of pedestrians, such as the number of tickets sold for a sports event, which may account for the number of expected no-shows, the number of students enrolled at a school etc.), or any other information that may impact traffic. The event data source 145 may also generate and/or store information for unplanned or other ad hoc events. For example, the event data source 145 may generate or store data for a car crash that occurred at an intersection or other segment of road, which may have been detected using one or more of the sensors 118, 119, 132, or 122 described above. The event data source 145 may generate or store data indicating a large number of pedestrians at, for example, an intersection. The large number of pedestrians may be detected using, for example, signals from the pedestrian's mobile devices 130, traffic cameras 120C at the intersection, audio sensors at the intersection, or any other sensors described herein. The event data source 145 may generate or store other types of events, such as an AMBER alert or other wireless emergency alert information (e.g., information describing the child, the last known location, the time, etc.).

The system 100 may comprise one or more weather data sources 140. Each weather data source 140 may comprise one or more database storing weather data, time data, location data, etc. The weather data may indicate, for example, whether a particular location is snowy (e.g., a blizzard), icy, or rainy (e.g., a torrential downpour). The weather data may also indicate sunrise or sunset times at each location, which may cause riskier driving conditions if the sun is in the driver's eyes. For example, sunrises may be riskier for drivers driving east toward the sun, and sunsets may be riskier for drivers driving west. Cloud cover may negate the effect of the sun on drivers, and therefore the weather data may indicate the amount of cloud cover at the location (e.g., cloudy, partly cloudy, etc.) Data from the weather data sources 140 may be accessed via, for example, open application program interfaces (APIs), databases, software development kits (SDKs), V2V communication, and/or mobile device to mobile device communication.

The system 100 may comprise one or more map data sources 170. The map data sources 170 may generate and/or store one or more street maps that may be used to map out navigations, traffic, etc., including third party maps and/or other third party map service provider. The map data source 170 may also generate and/or store map information for autonomous vehicles, which may be more detailed than maps used by non-autonomous vehicles. As will be described in further detail below, map data from the map data sources 170 may be used in conjunction with data from one or more of the other devices in the system 100 to control traffic flow or for vehicle navigation.

The system 100 may comprise one or more historical driver or vehicle data source(s) 175. The data source 175 may generate and/or store data related to drivers, such as each driver's risk score, accident history (including location and/or time of the accident(s), and context of accident(s), such as whether the driver was going straight, turning left, or turning right), driving record, or any other insurance or safety information associated with the driver. The data source 175 may generate and/or store data related to vehicles, such as the vehicle's make and model, year, accident history, maintenance history, the autonomous features supported by the vehicle, etc.

The system 100 may comprise one or more historical traffic and/or infrastructure data source(s) 180. The data source 180 may store data for a particular location, such as an intersection. The data may indicate the number of accidents at each intersection, and the time of the accident (e.g., exact time, time of day, time duration, etc.) and context of the accident (e.g., accident involving a rear end, accident involving a left turn, accident involving an emergency vehicle, accident involving pedestrian or bicycle, accident where a vehicle ran a red light, accident occurring in a particular lane of traffic, etc.). The data may comprise insurance data that may provide information indicating the riskiness of driving through or turning at an intersection.

Figure 2:
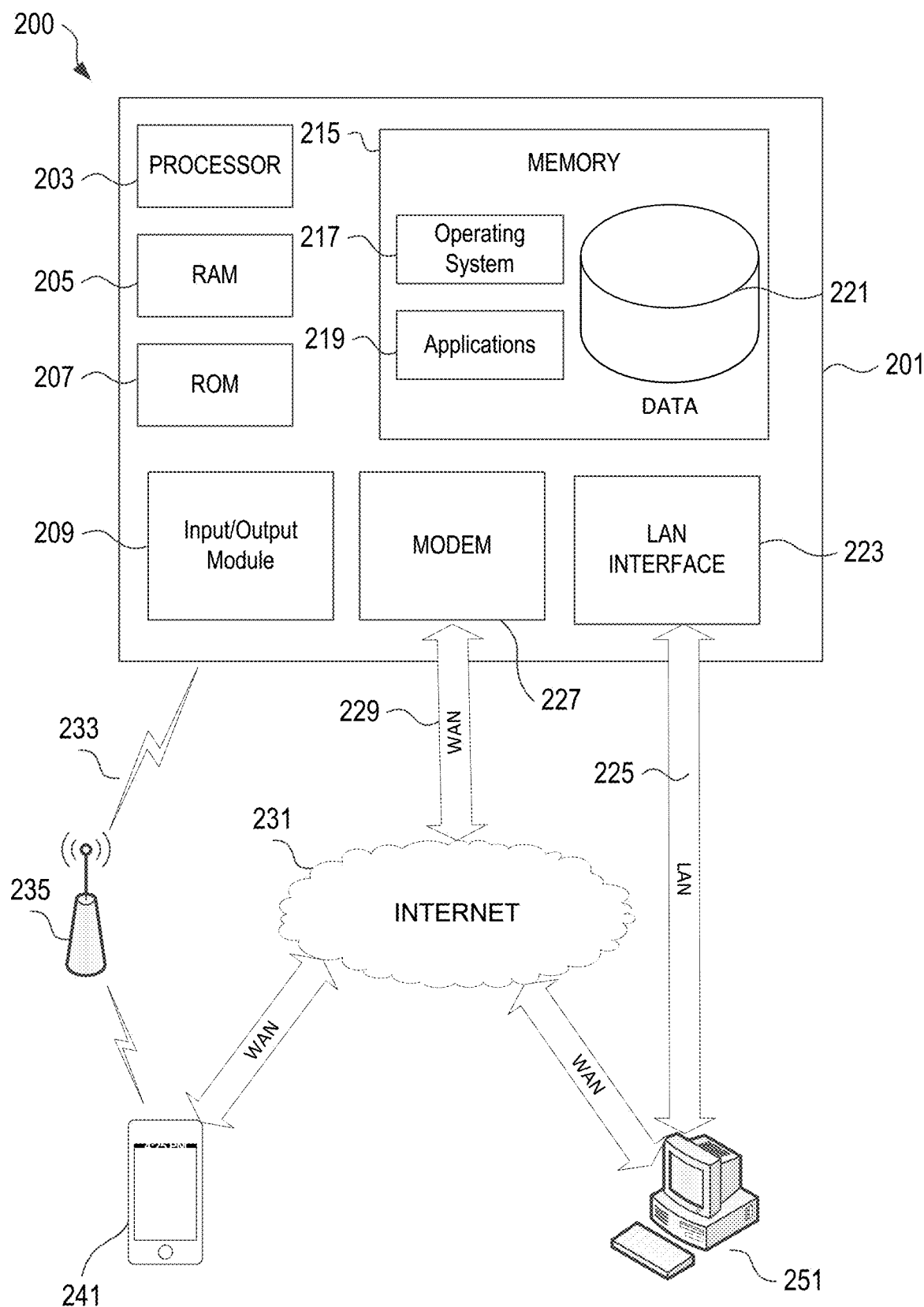
FIG. 2 illustrates an example network environment and computing systems that may be used to implement aspects of the disclosure.

FIG. 2 illustrates a block diagram of a computing device 201 in a vehicle and infrastructure control system 200 that may be used according to one or more illustrative embodiments of the disclosure. The computing device 201 may have a processor 203 for controlling overall operation of the computing device 201 and its associated components, including RAM 205, ROM 207, input/output module 209, and memory unit 215. The computing device 201, along with one or more additional devices (e.g., terminals 241, 251) may correspond to any of multiple systems or devices, such as vehicle and infrastructure control devices or systems, configured as described herein for determining the status of a traffic device and vehicle movement, monitoring or affecting movement of a vehicle using a traffic device, or determining a navigation route based on the location of a vehicle and generating a recommendation for a vehicle maneuver.

Input/Output (I/O) module 209 may include a microphone, keypad, touch screen, and/or stylus through which a user of the computing device 201 may provide input, and may also include one or more of a speaker for providing audio input/output and a video display device for providing textual, audiovisual and/or graphical output. Software may be stored within memory unit 215 and/or other storage to provide instructions to processor 203 for enabling device 201 to perform various functions. For example, memory unit 215 may store software used by the device 201, such as an operating system 217, application programs 219, and an associated internal database 221. The memory unit 215 includes one or more of volatile and/or non-volatile computer memory to store computer-executable instructions, data, and/or other information. Processor 203 and its associated components may allow the computing device 201 to execute a series of computer-readable instructions to determine the status of a traffic device and vehicle movement, monitor or affect movement of a vehicle using a traffic device, or determine a navigation route based on the location of a vehicle and generate a recommendation for a vehicle maneuver.

The computing device 201 may operate in a networked environment 200 supporting connections to one or more remote computers, such as terminals/devices 241 and 251. The computing device 201, and related terminals/devices 241 and 251, may include devices installed in vehicles, mobile devices that travel within vehicles, or devices outside of vehicles that are configured to receive and process sensor and contextual data. Thus, the computing device 201 and terminals/devices 241 and 251 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 201. The network connections depicted in FIG. 2 include a local area network (LAN) 225 and a wide area network (WAN) 229, and a wireless telecommunications network 233, but may also include other networks. When used in a LAN networking environment, the computing device 201 may be connected to the LAN 225 through a network interface or adapter 223. When used in a WAN networking environment, the device 201 may include a modem 227 or other means for establishing communications over the WAN 229, such as network 231 (e.g., the Internet). When used in a wireless telecommunications network 233, the device 201 may include one or more transceivers, digital signal processors, and additional circuitry and software for communicating with wireless computing devices 241 (e.g., mobile phones, short-range vehicle communication systems, vehicle sensing and telematics devices) via one or more network devices 235 (e.g., base transceiver stations) in the wireless network 233. In some aspects, short-range communication technologies, such as Bluetooth, may be used.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and vehicle and infrastructure control system components described herein may be configured to communicate using any of these network protocols or technologies.

Additionally, one or more application programs 219 used by the computing device 201 may include computer executable instructions (e.g., vehicle and infrastructure control algorithms, and the like) for determining the status of a traffic device and vehicle movement, monitoring or affecting movement of a vehicle using a traffic device, or determining a navigation route based on the location of a vehicle and generating a recommendation for a vehicle maneuver, and performing other related functions as described herein.

The vehicle and infrastructure control server 150, which may comprise the system 200, may receive data (e.g., sensor data) from one or more of the sensors or other data sources described above and analyze the data to determine the condition at one or more geographical locations (e.g., intersections, other road segments, near buildings, etc.). The server 150 may use the received and analyzed data to take one or more actions (and/or send instructions to one or more other devices) to improve pedestrian and vehicle safety, improve traffic flow, and the like. Exemplary actions taken (or transmitted) by the vehicle and infrastructure control server 150 (or any computing device receiving data) will now be described.

A computing device, such as the vehicle and infrastructure control server 150 and/or a traffic device 120, may modify traffic signals in response to receiving sensor or other data. In some aspects, the sensor data may indicate that an accident occurred at and/or within a threshold distance of the intersection. For example, a microphone may have captured sounds indicative of an accident involving one or more vehicles, bicycles, pedestrians, etc. A camera may have captured images indicative of an accident. Data from vehicle sensors 119 and/or mobile device sensors 118 (e.g., impact sensors, airbag deployment sensor, GPS or other location sensors, etc.) may be used to determine that an accident occurred at the intersection. Any of the sensors described herein may capture data indicative of an accident or other event that affects traffic flow through an intersection. The computing device may determine the degree of damage cause by the accidents, which may be determined based on the number of vehicles involved in the accident, the speed of the vehicles involved in the accident, the types of vehicles involved in the accident (e.g., sedan, SUV, motorcycle, etc.). Data may indicate other events as described herein, such as traffic congestion, events causing large crowds, etc.

The computing device may send an instruction to adjust the timing of a traffic light, such as to turn the light red, yellow, or green and/or to extend the color of a light (e.g., extend the green light). The traffic light may flash its light to indicate a hazard at or near the intersection. A traffic device 120 may initiate an audible warning siren and/or an audio statement. For example, stoplights or other signals may be used to prevent the progress of catastrophic events, such as additional accidents. In some aspects, the traffic light may change on the degree of damage of the accidents (e.g., number, speed, type, etc. of vehicles). Whether (and how) to adjust the lights may additionally or alternatively be based on the degree of importance of the traffic passing through the intersection. For example, the degree of importance may be high for intersections with high traffic volumes and lower for intersections with low traffic volumes. Some intersections may be tagged as highly important (or not). The degree of importance may also be determined based on the number of individuals interrupted (or potentially interrupted) by an accident or traffic congestion at the intersection.

The computing device may instruct the traffic light to switch to a different color or status in order to prevent an accident. For example, a sensor measuring westbound or eastbound traffic at an intersection may capture data that indicates that a vehicle is likely to run a red light. For example, the speed of the eastbound or the westbound vehicle may exceed a threshold speed such that the vehicle is likely to run the red light with or without braking. As another example, a mobile device sensor may determine that the driver is distracted if the driver is using the mobile device, using certain applications on the mobile device, etc. In response to the driver's speed and/or a determination that the driver is distracted, the computing device may instruct the traffic light facing the northbound and/or southbound lanes to turn red and/or keep it red a little longer to prevent vehicles from entering the intersection and consequently preventing a potential accident involving a vehicle running a red light.

The traffic device may display, via its display device, a message or written statement to drivers passing through or by the intersection (e.g., warning drivers of an accident, traffic congestion, or any other events that may affect traffic flow). In some aspects, the display device might be used for other purposes, such as advertising. For example, the display device may comprise a billboard, which may be configured to display one or more advertisements. The advertisement displayed on the billboard may change in response to sensor or other data. For example, the advertisement may be adjusted based on the type of vehicles (e.g., make and/or model) passing through the intersection or other segment of road or the type of mobile devices (e.g., ANDROID or iOS) in those vehicles.

A computing device, such as the vehicle 110, the mobile computing device 116, the traffic device 120, and/or the vehicle and infrastructure control server 150, may adjust one or more speed limits or speeds for vehicles in response to receiving sensor or other data. The computing device may adjust the speed limit at or near an intersection or any other segment of road based on one or more variable risk factors. For example, if a risk score of the intersection increases, the computing device may slow down the speed limit at or near the intersection (or approaching the intersection). The speed limit may be adjusted for certain lanes of the segment of road. For example, if there is a gas station or other venue on the right side of a road, the computing device may determine congestion (or the potential for congestion) in the right lane caused by more vehicles turning right. In response, the computing device may lower the speed limit for the right lane for one or more segments of road approaching the gas station or other venue. Additionally or alternatively, the computing device may be used to optimize commerce opportunities, such as by detecting where commerce is about to occur (e.g., lots of people going to a certain gas station). The computing device may instruct a display device to, for example, display advertisements at or before that location.

As another example, the computing device may determine that an emergency vehicle (e.g., ambulance, fire truck, etc.) is approaching an intersection or other segment of road. The computing device may increase the speed limit for the left lane for one or more segments of road such that vehicles may speed up to get out of the way of the approaching emergency vehicle. Alternatively, the computing device may decrease the speed limit for the left lane in order to incentivize vehicles to move to the right lanes such that the emergency vehicle can pass. As described above, one or more audio or video messages may be used to warn drivers of approaching emergency vehicles.

The speed limit may also be adjusted for one or more driver or vehicle. That is, the speed limit can be dynamic for individual vehicles or drivers. Adjusting the speed limit vehicle-by-vehicle may be based on one or more of the following factors: detecting low tire pressure, detecting tire burst, detecting the driver's health condition (e.g., fatigue, or other health condition), detecting an accident ahead of the vehicle in a particular lane, detecting a vehicle ahead turning on its hazard lights, detecting a maintenance issue (e.g., detected by onboard vehicle diagnostics), etc.

Figure 4:
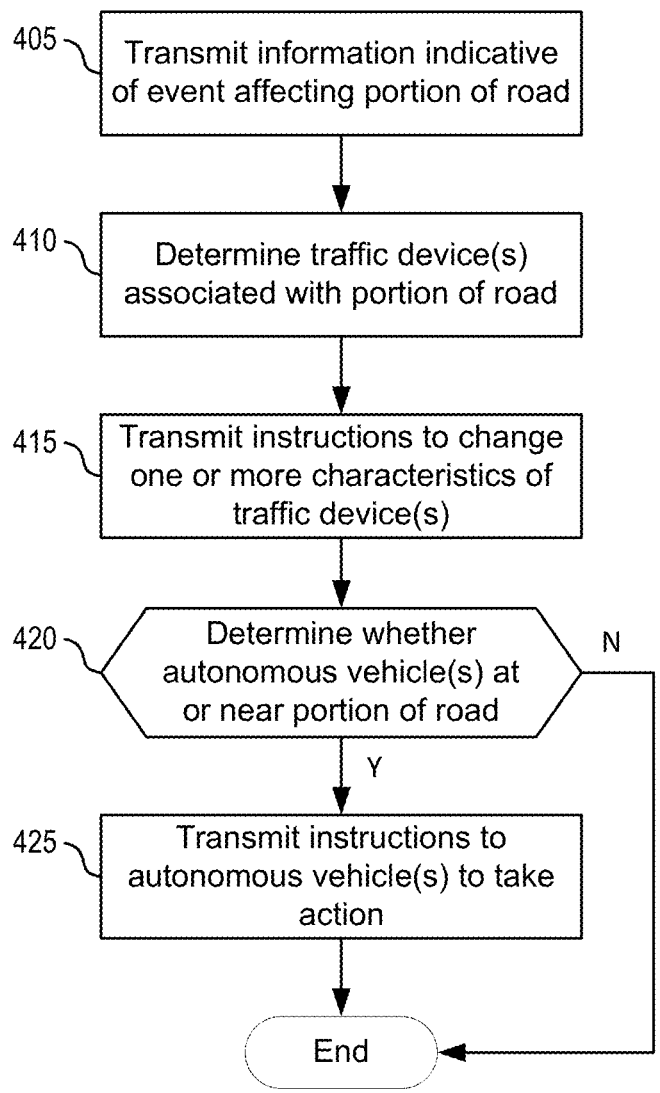
FIG. 4 is a flow diagram illustrating an example method of monitoring or affecting movement of a vehicle using a traffic device according to one or more aspects of the disclosure.

In some aspects, the speed limit for roads or road segments may be dynamically changed based on one or more factors, such as the time of day, traffic congestion on the road or road segment, the risk score for the segment of road, planned or ad hoc events, among other factors. FIG. 4 is a flow diagram illustrating an example method of monitoring or affecting movement of a vehicle using a traffic device according to one or more aspects of the disclosure.

The computing device may determine planned events based on, for example, calendar information. In step 405, an event data source may transmit, e.g., to a vehicle and infrastructure computing device, information indicative of an event affecting a portion of road. In step 410, the computing device may determine one or more traffic devices associated with the portion of road and configured to control traffic for the portion of road, such as traffic lights, speed limit displays, and the like. In step 415, the computing device may send, to the one or more traffic devices associated with the portion of road, instructions to change one or more characteristics of the one or more traffic devices. The sending may be based on the information indicative of the event affecting the portion of road. Several examples of changing the characteristics will now be provided.

The speed limit may be adjusted to cause drivers to drive at the safest speed for that road segment and/or time of day. If a safer possible speed exceeds the speed limit, the speed limit may be increased to match or exceed the safer possible speed. The speed limit may be decreased during rush hour, during heavy traffic congestion, if the risk score (e.g., risk score for a road segment, such as an intersection) is high, and/or during events that may cause traffic congestion or other dangers. The timing, such as frequency, of red lights at a traffic light may additionally be increased in conjunction with (or independently from) the speed limit being decreased, such as based on calendar information indicating one or more events that may affect certain segments of road. The number of pedestrians expected as a result of the event may be compared to a threshold number of pedestrians. The speed limit may be increased during non-peak hours, during low traffic congestion, if the risk score is low, and/or if no special events are planned.

The speed and/or speed limit of a vehicle may be adjusted in order to prevent an accident, such as to cause the vehicle to miss another vehicle at an intersection. For example, a sensor measuring westbound or eastbound traffic at an intersection may capture data that indicates that a vehicle is likely to run a red light. The speed of the eastbound or the westbound vehicle may exceed a threshold speed such that the vehicle is likely to run the red light with or without braking. As another example, a mobile device sensor may determine that the driver is distracted if the driver is using the mobile device, using certain applications on the mobile device, etc. In response to the driver's speed and/or a determination that the driver is distracted, the computing device may increase and/or decrease the speed limit for the northbound or southbound vehicle to prevent it from colliding with the vehicle running the red light at the intersection.

The computing device may indicate the speed limit to drivers in various ways. For example, electronic displays on the road may be used to indicate the speed limit, and the computing device may send instructions to one or more of the electronic displays to adjust the speed limit, such as from 55 MPH to 65 MPH. In some aspects, each lane of the road or road segment may have a digital display so that the speed limit for each lane may be adjusted individually. The computing device may send instructions to those digital displays in order to change the speed limit for one or more lanes. Speed limits may additionally or alternatively be displayed within vehicles. For example, a display device in the vehicle may display the speed limit for the road or the speed limit for that driver. The display of a mobile device in the vehicle may also be used to display the speed limit, such as if the driver is using a navigation application of the mobile device. The display of the vehicle and/or the mobile device may display the speed limit for the road, the speed limit for a particular lane, and/or the speed limit for that particular vehicle.

In some aspects, the speed of an autonomous vehicle may be adjusted directly (e.g., instead of adjusting the speed limit). In step 420, the computing device may determine whether any autonomous vehicles are at or near the affected portion of road. If so (step 420: Y), the computing device, in step 425, may send, to the autonomous vehicle(s), instructions to take one or more actions in response to the event affecting the portion of road. Each autonomous vehicle may be instructed to apply brakes, to slow down, or to speed up. For example, the computing device may send an instruction to the autonomous vehicle to adjust its speed, such as to match a safer speed and/or to match an adjusted speed limit. In some aspects, autonomous vehicles may be adjusted to match the conditions of the road. The speed limit for autonomous vehicles may be different from the speed limit for non-autonomous vehicles. For example, the speed limit may be 55 MPH for vehicles in an autonomous mode, and faster (e.g., 65 MPH) for vehicles not in autonomous mode (or vice versa). As previously described, the speed limit may be displayed on one or more display devices and/or sent to autonomous vehicles directly.

A computing device, such as the vehicle and infrastructure control server 150 and/or a traffic device 120, may adjust flow through one or more traffic lanes in response to receiving sensor or other data. The computing device may open or close certain lanes based on road conditions indicated by sensor data. The computing device may send commands to display devices 120E on the road to indicate whether a certain lane is open or closed. For example, sensor data may indicate that traffic congestion has exceeded a threshold congestion level, and the computing device may open one or more additional traffic lanes accordingly. As another example, sensor data may indicate that an accident ahead of a particular road segment occurred in one or more lanes. Based on this sensor data, the computing device may close the affected traffic lanes a certain distance prior to the accident (e.g., 1 mile, ¼ mile, etc. from accident). As another example, the computing device may close certain lanes (e.g., left lanes, left turn lanes, shoulder lanes, etc.) to regular traffic to allow other types of vehicles to pass, such as emergency vehicles, maintenance trucks, snow plows, etc. In addition to closing lanes to regular traffic, the computing device may align a plurality of traffic lights on the route of the emergency vehicle (e.g., by turning them green). The computing device may detect the presence of these emergency vehicles based on traffic cameras, microphones configured to listen for sirens, GPS location data for emergency vehicles, etc.

A computing device, such as the vehicle and infrastructure control server 150, may contact (e.g., call, broadcast, or otherwise communicate) a broadcast or emergency receiver 185 in response to receiving sensor or other data. For example, if a sensor hears or sees a car crash, the computing device may call emergency vehicles to the location of the car crash. Sensors inside of vehicles (e.g., vehicle sensors 119 and/or mobile device sensors 118) may also be used to detect emergency conditions in the car, such as a heart attack, a birth, or other medical issues. The computing device may also send notification of, for example, an AMBER alert to the broadcast and/or emergency receiver 185 for the receiver 185 to initiate proper protocols for these emergency situations, such as contacting emergency personnel.

A computing device, such as the vehicle and infrastructure control server 150 and/or the traffic device 120, may contact (e.g., call, broadcast, or otherwise communicate) government authorities or their devices to improve driving conditions in response to receiving sensor or other data. For example, sensors on the road (e.g., water depth sensors), in the vehicle 110, and/or in the mobile device 116 may sense ice buildup (e.g., if vehicles are sliding on the road), excess water buildup (e.g., if vehicles are hydroplaning or otherwise slipping), or any other potentially dangerous conditions. The computing device may call the appropriate government authorities, which may come to plow and/or lay down salt for the road. If available, the computing device may electrify or otherwise heat the road to cause ice or snow to melt. Environmental conditions on ramps may be determined in a similar manner.

A computing device, such as the vehicle and infrastructure control server 150, the traffic device 120, and/or the vehicle 110, may communicate with vehicles, such as sending instructions or other data, in response to receiving sensor or other data. For example, the computing device and/or intersection infrastructure may broadcast the status of the intersection (e.g., the color of the light, an anomaly at the intersection, such as an accident, etc.) to nearby vehicles.

As previously described, the computing device may send instructions to autonomous vehicles to control the vehicle, such as to increase or decrease the vehicle's speed. For example, the computing device may send an instruction to the vehicle to adjust the level of autonomy, such as to turn off autonomous mode (e.g., switch to manual mode), or to switch to an autonomous safe mode (e.g., a semi-autonomous mode). Similarly, the computing device may send an instruction to the autonomous vehicle to take a specific action, such as to brake, to slow down, or to speed up. The computing device may send the instruction in response to detecting an event at the intersection, such as unusual congestion, a traffic accident, an unusual number of pedestrians or bicycles, etc.

As another example, the computing device may determine that a vehicle approaching an intersection and going the opposite direction of an autonomous vehicle is turning left. The computing device may make this determination based on sensor data, such as data from a traffic camera showing that the vehicle is in a left turn lane and/or has its left turn blinkers on, data from a navigation application of the vehicle guiding the vehicle to make a left turn at the intersection, the vehicle slowing down at a certain rate of speed at the intersection, or any other sensor data. Based on the determination that the vehicle going the opposite direction of the autonomous vehicle is turning left, the computing device may send one or more instructions to the autonomous vehicle. For example, the computing device may instruct the autonomous vehicle to slow down or stop to allow the other vehicle to turn left.

The computing device may make similar determinations and send similar instructions for vehicles going the same direction as the autonomous vehicle. For example, the computing device may determine that a vehicle traveling in the same direction as (and in the same lane as) the autonomous vehicle is expected to turn left or right at an intersection. The computing device may instruct the autonomous vehicle in the same lane as the vehicle that is about to turn left or right to slow down or stop in anticipation of the vehicle in front of the autonomous vehicle slowing down in order to turn.

Traffic infrastructure may be used to sense the condition of a vehicle, and to communicate the condition of the vehicle to the driver and/or vehicle. For example, a traffic camera 120C may capture one or more images of a passing vehicle. The traffic camera 120C or other computing device may process the images (e.g., in real time) to determine a condition of the vehicle. For example, the computing device may determine, based on the captured image, that the vehicle has low tire pressure. The computing device may determine that the vehicle's headlamp is off at nighttime. In response to determining the condition of the vehicle that may require action by the driver, the computing device may send to the vehicle and/or a mobile device in the vehicle an indication of the condition of the vehicle. The vehicle and/or mobile device may display or otherwise indicate to the driver the condition of the vehicle, such as if the tire pressure is low or the headlamp is off when it should be on. In some examples, the computing device may transmit an instruction to the vehicle causing the headlights to turn on automatically (e.g., without driver interaction).

Figure 3A:
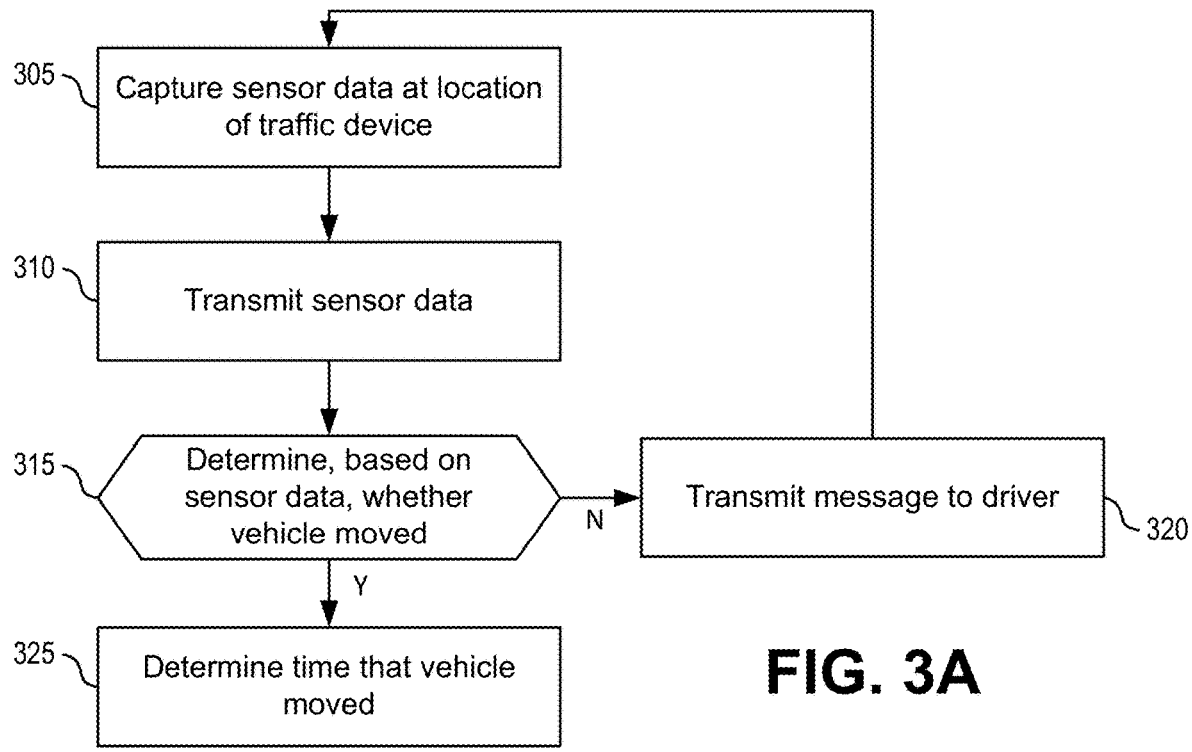
FIGS. 3A-B are flow diagrams illustrating example methods of determining status of a traffic device and vehicle movement according to one or more aspects of the disclosure.
Figure 3B:
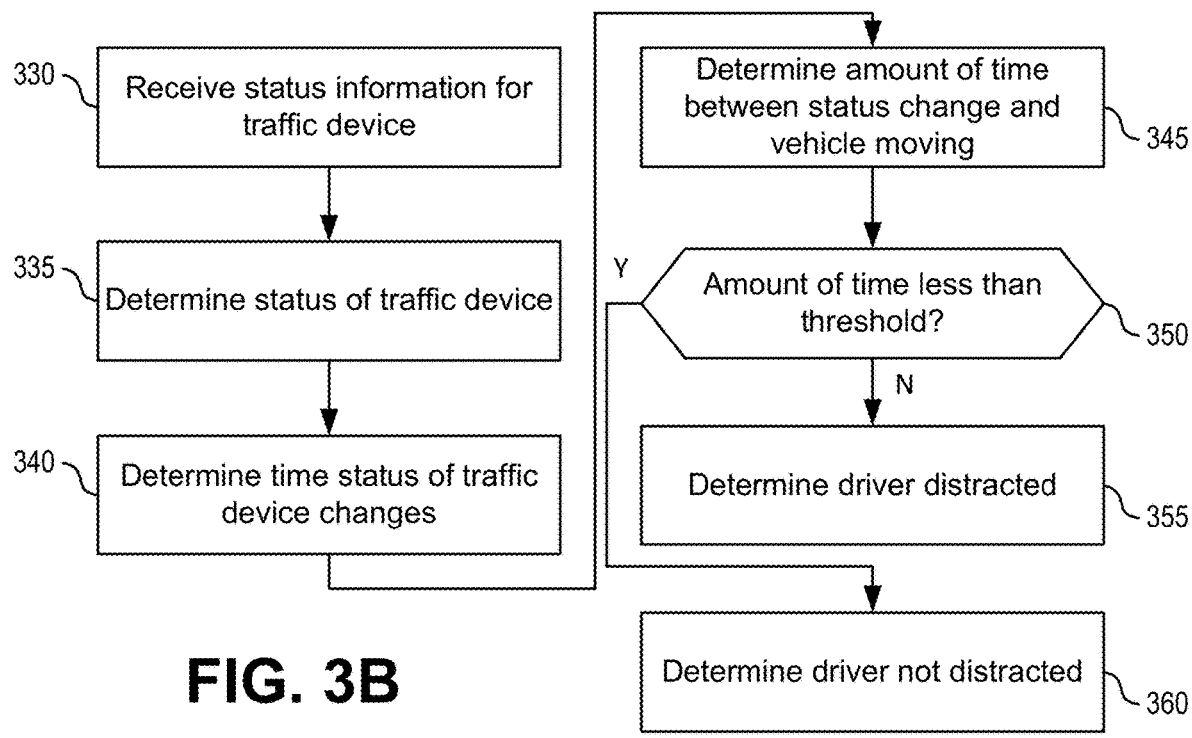

FIGS. 3A-B are flow diagrams illustrating example methods of determining a status of a traffic device and vehicle movement according to one or more aspects of the disclosure. The computing device may be used to detect distracted driving, such as a distracted driver at an intersection. With reference to FIG. 3A, in step 305, a camera (e.g., a traffic camera) or another type of presence sensor at the intersection may be used to detect movement of a vehicle after a red light at the intersection turns green. For example, the traffic camera may transmit one or more images of the vehicle captured by the traffic camera. Based on the one or more images of the vehicle captured by the traffic camera, the computing device may determine the time that the vehicle at the location of the traffic device moved.

Sensors 119 in the vehicle 110 and/or sensors 118 in the mobile device 116 may also be used to detect vehicle movement. For example, the mobile device and/or the vehicle may have one or more of a position sensor, speed sensor, or acceleration sensor for detecting movement. In step 310, the mobile device and/or vehicle may transmit to the computing device data indicative of one or more of a position, speed, or acceleration of the vehicle (e.g., based on sensor data). In step 315, the computing device may determine, based on the sensor data, whether the vehicle moved. If not, the computing device may proceed to step 320. Alternatively, in step 325, the computing device may determine the time that the vehicle at the location of the traffic device moved based on the sensor data (e.g., data indicative of one or more of the position, speed, or acceleration of the vehicle).

In some aspects, a traffic device, which may comprise one or more traffic signals, may transmit, via its transceiver and to a vehicle and infrastructure computing device, information indicative of a status of the one or more traffic signals (e.g., whether the signal is red, yellow, green, etc.). With reference to FIG. 3B, in step 330, the computing device may receive, from the traffic device, the information indicative of the status of the one or more traffic signals. In step 335, the computing device may determine whether the traffic signal is red, yellow, green, flashing, etc. For example, the computing device may determine that the traffic device switched from a red light to a green light. In step 340, the computing device may also determine a time that the status of the traffic device changes (e.g., one or more traffic signals of the traffic device switched from the red light to the green light). In step 345, the computing device may determine an amount of time between the time that the one or more traffic signals of the traffic device switched from the red light to the green light and a time that a vehicle at a location of the traffic device moved.

In step 350, the computing device may determine whether the amount of time from when the vehicle moved is within a threshold amount of time. If not (step 350: N), the computing device, in step 355 may determine that the driver is distracted. For example, the driver may be texting or otherwise using a mobile device at the intersection and not react quickly enough to the traffic light turning green. That is, the driver might be slow to step on the gas pedal after the light turns green. In some aspects, the computing device may compare the driver's reaction time (e.g., 5 seconds) to a threshold (e.g., typical) reaction time (e.g., 1 or 2 seconds). If the driver's reaction time exceeds the threshold (e.g., by a certain amount of time), the computing device may determine that the driver is distracted. Otherwise, the computing device in step 360 may determine that the driver is not distracted.

The computing device may perform one or more actions based on a determination that the driver is distracted (e.g., a reaction time lower than a threshold reaction time). For example, the computing device may adjust the driver's risk score and/or charge the driver a higher insurance premium if it is determined that the driver is distracted. In step 320, the computing device may also send a message to the vehicle 110 and/or mobile device 116 for display to the driver. For example, the message may indicate that the light is green (e.g., that the light switched from red to green) and for the driver to go on green. Prior to the light turning green, the computing device may send a message to the vehicle or mobile device indicating when light will turn green, such as a countdown. The messages may be used to audibly or visually notify the driver. The message may be a warning against inattentive driving, and in some cases, may comprise a traffic ticket.

Figure 6:
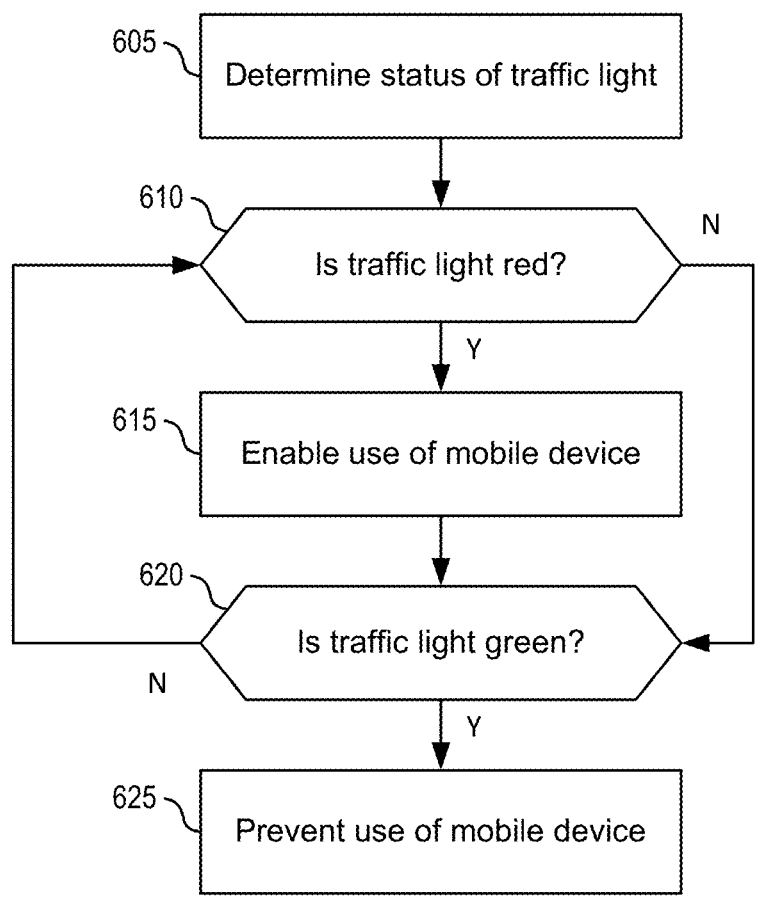
FIG. 6 is a flow diagram illustrating an example method of sending instructions to and/or controlling a device in a vehicle based on the status of a traffic device according to one or more aspects of the disclosure.

FIG. 6 is a flow diagram illustrating an example method of sending instructions to and/or controlling a device (e.g., a mobile device) in a vehicle based on the status of a traffic device according to one or more aspects of the disclosure. An application or service may be installed on a mobile device, and the application or service may prevent the mobile device from being used in certain situations. If the vehicle is at the location of a traffic light, and the traffic light is red, the computing device may send an instruction to the mobile device of the driver (e.g., the application or service installed on the mobile device) to allow driver interaction with the mobile device while the one or more traffic signals of the traffic device is red. For example, in step 605, the computing device may determine the status of a traffic light (e.g., red, yellow, green, etc.). In step 610, the computing device may determine whether the traffic light is red. If the traffic light is red (step 610: Y), the computing device, in step 615, may enable use of the mobile device while the light is red. For example, the computing device may send an instruction to the mobile device of the driver (e.g., the application or service installed on the mobile device), and the instruction may cause the application or service on the mobile device to turn off one or more prevention features that prevent the mobile device from being used by the driver (or otherwise enable use of the mobile device and one or more applications thereof). Once the light turns green (or at a predetermined time before it turns green, such as 10 seconds), the computing device may send an instruction to the mobile device that prevents the user from texting or otherwise interacting with the mobile device. For example, in step 620, the computing device may determine whether the traffic light is green. If so (step 620: Y), the computing device, in step 625, may send an instruction (e.g., to the application or service installed on the mobile device) to prevent the driver from using one or more applications of the mobile device, such as a messaging (e.g., texting) application, or otherwise prevent the driver from using the mobile device or application on the mobile device. The instruction may cause the application or service to disable one or more other applications or services on the mobile device. Otherwise (step 620: N), the computing device may return to step 610 to wait for the light to turn green.

In some aspects, the computing device may provide the driver (e.g., via the mobile device, vehicle, or other computing device) with information indicative of how the driver compares to other drivers. For example, the driver may be provided with information indicative of the driver's speed relative to other drivers' speeds (e.g., if the driver is in the top 1% of speed). The computing device may provide additional information, such as the driver's reaction time to lights, the driver's risk score, etc.

Aspects described herein may be used for automatic donations. For example, volunteers are often at intersections collecting donations for their cause. Rather than having volunteers walk around collecting money for charity at the intersection (which may be unsafe), the user may automatically make a donation via the user's mobile device and/or a button in the vehicle. In some aspects, the driver might only be permitted to make a donation if the light is red or the vehicle is otherwise stopped at the intersection. As a result, volunteers, such as firefighters, collecting donations at intersections or other portions of road may be safer than if these volunteers physically collected the donations.

Figure 7A:
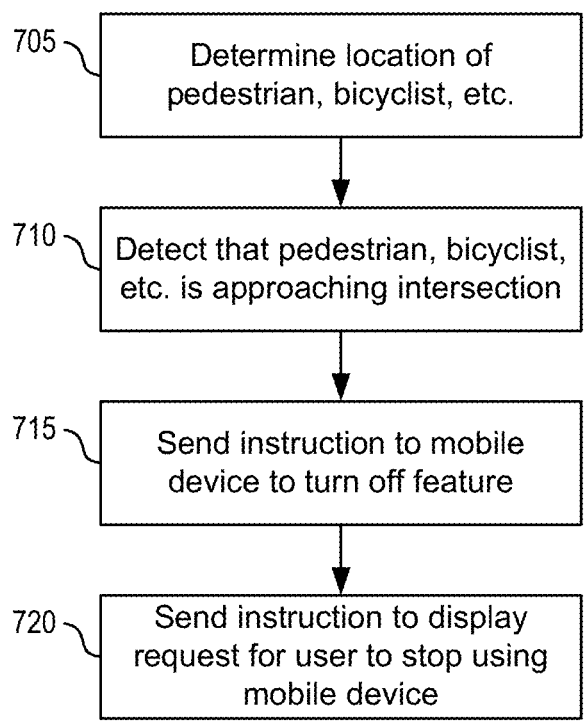
FIGS. 7A-B are flow diagrams illustrating example methods of sending instructions to and/or controlling a traffic device and/or mobile device to control the flow of pedestrians, bicyclists, etc. through an intersection according to one or more aspects of the disclosure.
Figure 7B:
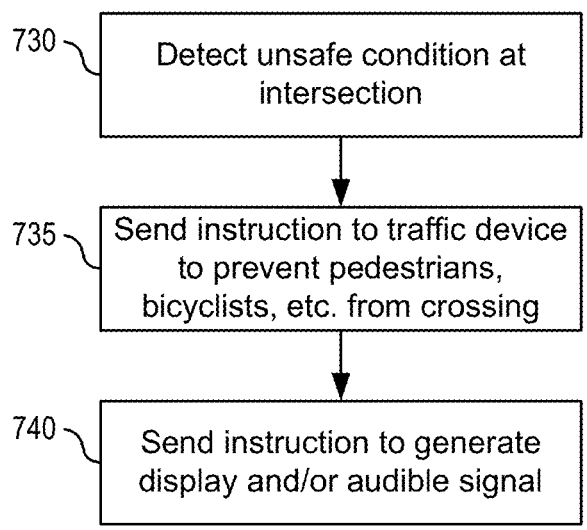

FIGS. 7A-B are flow diagrams illustrating example methods of sending instructions to and/or controlling a traffic device and/or mobile device to control the flow of pedestrians, bicyclists, etc. through an intersection according to one or more aspects of the disclosure. A computing device, such as the vehicle and infrastructure control server 150, a mobile computing device 130, and/or the traffic device 120, may communicate with or modify the flow of pedestrians or bicyclists through a portion of road, such as an intersection. In some aspects, the computing device may disable one or more functionalities of a pedestrian's mobile device based on the pedestrian's distance from or proximity to an intersection. For example, and with reference to FIG. 7A, the computing device, in step 705, may determine a pedestrian's location based on a sensor of the mobile device 130 (e.g., GPS or other location sensor), a sensor at the intersection (e.g., a camera), or any other sensors. In step 710, the computing device may determine that the pedestrian is approaching the intersection (e.g., within a threshold distance from the intersection, such as 10 feet). In response to these determination(s), the computing device, in step 715, may send an instruction to the mobile device for the mobile device to turn off, to turn off a screen, and/or to stop an application (e.g., to prevent the pedestrian from texting). In step 720, the computing device may also send an instruction to the mobile device for the device to display a message requesting the pedestrian to stop using the mobile device has the pedestrian approaches the intersection. As a result, the pedestrian might not be able to (or be less inclined to) use his or her mobile device in certain ways while crossing a street or intersection.

In some aspects (and with reference to FIG. 7B), the computing device may use infrastructure, such as a pedestrian barrier, at an intersection or other portion of road to prevent pedestrians from crossing. Based on sensor data, the computing device, in step 730, may detect an unsafe condition at the intersection, such as a vehicle about to run a red light, a traffic accident, the presence of an emergency vehicle approaching the intersection, or any other unusual condition or event. In response to determining that the intersection is not safe for pedestrians, the computing device, in step 735, may send an instruction to activate (e.g., raise or lower) a physical barrier (e.g., the barrier 120D) to prevent pedestrians from entering the intersection or otherwise crossing the road. In some aspects, the barrier may be similar to a train crossing or subway crossing barrier, or may be any type of physical barrier that blocks pedestrians from entering the road. In step 740, the computing device may additionally or alternatively send an instruction to a speaker at the intersection to generate a high-pitched sound that when initiated, causes pedestrians to freeze, collapse, or otherwise stop walking at the intersection. The computing device may also send an instruction to a display at the intersection to instruct pedestrians not to cross, such as a do not walk signal.

Instead of (or in addition to) controlling infrastructure on the road, the computing device may send commands to a pedestrian's mobile device to prevent the pedestrian from crossing the road. For example, the computing device may send an instruction for the mobile device to emanate a high-pitched sound that causes the pedestrian to stop. The computing device may similarly send an instruction to the mobile device to vibrate, playback an audio message, and/or display a visual message to instruct the pedestrian not to cross the intersection (or to otherwise notify the pedestrian of an event affecting a portion of road). An audio alert may be presented to the pedestrian through headphones plugged in to the mobile device and/or through the mobile device's speakers. The computing device may also send an instruction to the headphones to turn off active noise cancellation when the pedestrian approaches intersection.

A computing device, such as the vehicle and infrastructure control server 150, may collect data before, during, and after an accident to determine fault in response to receiving sensor or other data. The data may be stored in one or more databases, which may be used to determine fault and to issue claims. For example, the data may be incorporated in the historical driver and vehicle data source 175. As previously explained, traffic cameras may be used to detect accidents, and the captured images may be used to assist in determining claims and/or fault. Location data (e.g., GPS data), speed data, acceleration data, weather data, images data, etc. may be used to determine accidents and/or fault. This data may be combined with data indicating the status and/or risk scores of intersections or other segments of road, such as whether the light was red, the speed limit of the segment of road, etc., to determine fault.

A computing device, such as the vehicle and infrastructure control server 150, may adjust navigation score(s) (e.g., risk score(s)) for each intersection (or other portion of a road) in response to receiving sensor or other data. Each intersection may have an intersection risk score, and the computing device may determine the intersection risk score based on one or more factors, such as the complexity of the intersection (e.g., the number streets passing through the intersection), the number of accidents historically occurring at the intersection, weather, traffic congestion, and other dynamic factors. If an accident occurs at the intersection, the computing device may increase the risk score for the intersection. An intersection path risk map may be generated based on the risk scores for each intersection on the map.

A computing device, such as the vehicle and infrastructure control server 150, may generate one or more recommended driving routes (e.g., navigation routes) in response to receiving sensor or other data. For example, the computing device may generate navigation routes based on intersection risk scores, risk scores for one or more other segments of road, and/or insurance cost data. The navigation route may be provided to the driver on a display of the driver's vehicle 110, on the display of the mobile device 116, etc. If multiple routes are available, the driver may be able to compare each route and select a route to take. One or more of the routes may be designated a preferred route, such as if the route has the lowest cumulative risk score.

Figure 5:
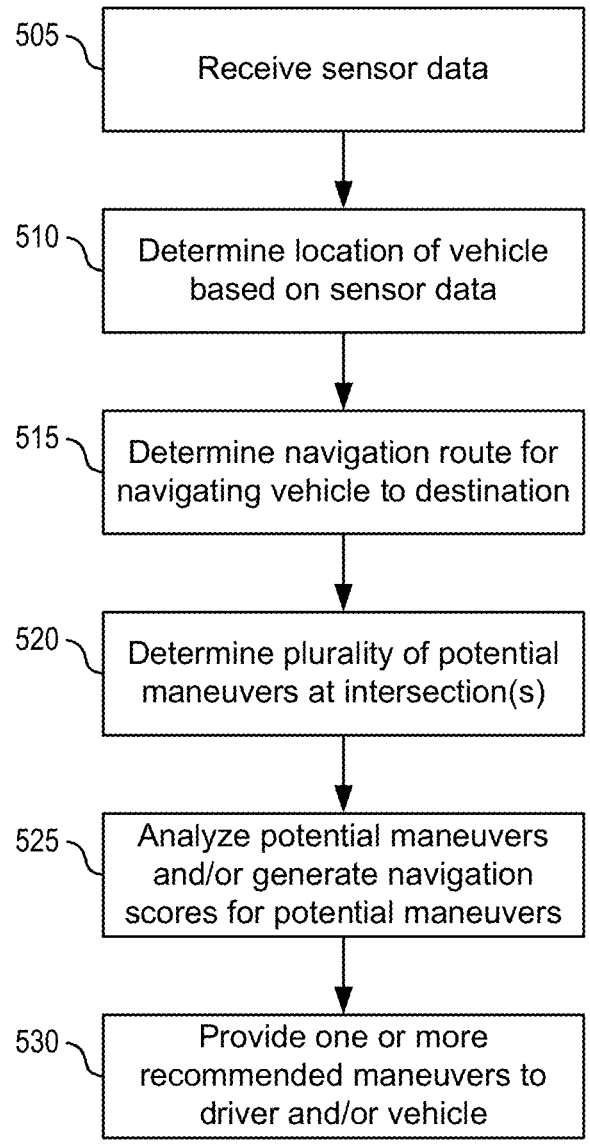
FIG. 5 is a flow diagram illustrating an example method of determining a navigation route based on the location of a vehicle and generating a recommendation for a vehicle maneuver according to one or more aspects of the disclosure.

FIG. 5 is a flow diagram illustrating an example method of determining a navigation route based on the location of a vehicle and generating a recommendation for a vehicle maneuver according to one or more aspects of the disclosure. In step 505, the computing device may receive sensor data from, for example, a location sensor of a mobile device or a vehicle. In step 510, the computing device may determine the location of the vehicle based on the sensor data. As previously described (and as illustrated in step 515), the computing device may determine a navigation route for navigating the vehicle from the location to a destination.

The navigation route may comprise a plurality of intersections. In step 520, the computing device may determine a plurality of potential maneuvers at one or more of the intersections. In step 525, the computing device may analyze each maneuver through an intersection, and generate a navigation score for each of those maneuvers. The navigation scores may be based on one or more factors described herein. For example, the navigation score (e.g., a cost, such as an insurance cost) of turning left at an intersection may be X, whereas the navigation score (e.g., a cost) of making three right turns to achieve the same goal may be Y. In some aspects, X may be lower than Y (e.g., the single left turn is cheaper, safer, and/or faster), and in other aspects, Y may be lower than X (e.g., the three right turns is cheaper, safer, and/or faster). That is, the computing device may determine whether to recommend a left turn or three right turns to the driver for one or more intersections, based on the risk score of the intersection. Going straight through the intersection may also have a navigation score assigned to it. Another type of maneuver may be a U turn at the intersection. In step 530, the navigation scores may be analyzed by the computing device and used to provide one or more proposed maneuvers (and consequently routes) to the driver. For example, the computing device may wirelessly transmit a selected maneuver to a navigation application running on the mobile device or the vehicle's system. In some aspects, the navigation scores may be used by a routing application to generate a driving route.

Driver preferences may be included in determining risk scores and/or recommended navigation routes. A driver may prefer particular types of intersections or maneuvers. For example, the driver might not desire to perform certain maneuvers, such as left turns or U turns. Drivers may also prefer to drive below certain speeds, such as 40 MPH. Preferences may be based on how long the driver has been driving, such that more complex maneuvers may be less desired than simpler maneuvers. The driver may provide these preferences to the computing device (e.g., by inputting preferences into the mobile device 116, vehicle 110, or other computing device), and the computing device may factor in these preferences to determine whether to recommend a particular path or maneuver. For example, the computing device might not recommend a navigation path that includes a highway if the driver desires to stay below 40 MPH, or may recommend three right turns instead of a left turn if the driver does not desire to make a left turn.

The computing device may also determine the navigation score and/or risk based on individual lanes on a segment of road, such as a highway. That is, each lane may have a different risk. For example, the right lane may be riskier than the middle lane or left lane on a city street, or the left lane may be riskier than the right lane on a freeway. The computing device may determine the navigation score for a particular route based on which lanes the driver is expected or recommended to travel on for a particular portion of the route.

Some intersections or other segments of road might not permit certain types of vehicles, such as autonomous vehicles. If the computing device determines that the vehicle to be navigated is an autonomous vehicle, the computing device may avoid these intersections that do not permit autonomous vehicles. That is, the computing device may reroute the autonomous vehicle through a different intersection. In some aspects, these intersections may permit autonomous vehicles, but driving autonomous vehicles through these intersections may be dangerous. One or more of the factors used to determine scores for maneuvers at intersections may include a level of autonomy of the vehicle (e.g., manual, semi-autonomous, fully autonomous, the number of autonomous features of the vehicle, etc.). Accordingly, the computing device may determine the navigation score for each potential maneuver based on the level of autonomy of the vehicle. The computing device may increase the risk score accordingly to disincentivize a route that includes one or more of these intersections.

Based on recommended routes, the computing device may send instructions to the vehicle to switch between autonomous mode and non-autonomous mode. For example, if the vehicle will be traveling through an intersection that prohibits autonomous vehicles or that is dangerous for autonomous vehicles, the computing device may instruct the vehicle to switch to non-autonomous mode. The computing device may activate or deactivate (e.g., turn on or off) individual autonomous vehicle features. For example, the computing device may receive, from a vehicle or mobile device, data indicating that the vehicle is approaching an intersection. In response to receiving the data indicating that the vehicle is approaching the first intersection, the computing device may send, to the vehicle, an instruction to deactivate one or more of its autonomous features. Moreover, the type of maneuver through the intersection may be determined based on whether the vehicle is autonomous or not. For example, the computing device may instruct non-autonomous vehicles to make a left turn through a certain intersection, and may instruct autonomous vehicles to make right turns and/or to go straight through the intersection. The computing device may also send the selected maneuver to the autonomous vehicle. One maneuver may be recommended if the vehicle is autonomous, while another maneuver may be recommended if the vehicle is not autonomous. In some aspects, vehicles and/or mobile devices with vehicles may have the ability to detect the type of intersection (e.g., smart intersection or standard intersection), and may send data indicating the type of intersection to the vehicle and infrastructure control server 150 and/or another central repository.

A computing device, such as the vehicle and infrastructure control server 150, may adjust a characteristic of an insurance policy based on the driver's route, including which intersections the driver passes through and which turns the driver makes at the intersection. The computing device may adjust a driver's insurance premium if the driver goes through a risky intersection, which may be based on the risk score for the intersection. For example, the driver might not have followed the route recommended by the computing device.

As previously explained, the computing device may determine one or more risk score for the intersection. Intersection route risk scores may be based on one or more static factors and/or one or more dynamic factors. Static factors may include, for example, past accident information and the like. Dynamic factors may include, for example, information regarding the risk level of other vehicles on the road, the time of day, the current weather, etc. If there is an accident at an intersection, the risk score of the intersection may increase. In some instances, the risk score may increase significantly over a short period of time, such as if the accident at the intersection has not cleared. Once the accident has been cleared, the risk score for the intersection may return to normal levels (or slightly higher levels to account for the new accident). Intersections may be provided with a plurality of different risk scores, depending on a car's direction of travel through the intersection. For example, different risk scores may be assigned to northbound travel, southbound travel, eastbound travel, and westbound travel through the intersection.

The characteristic of the insurance policy may also be adjusted based on whether the driver is a distracted driver, as previously described. The insurance premium may be increased if the driver is a distracted driver, but decreased if the driver is an attentive driver.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method comprising:
  determining, by a computing device and for a vehicle, a navigation route comprising one or more intersections;
  determining, by the computing device, a plurality of potential maneuvers at an intersection of the one or more intersections of the navigation route of the vehicle;
  determining, by the computing device and based on a level of autonomy of the vehicle, a navigation score for each of the plurality of potential maneuvers at the intersection;
  selecting, by the computing device and based on the navigation score for each of the plurality of potential maneuvers at the intersection, a maneuver; and
  sending, via one or more wireless communications and to the vehicle, the maneuver.

2. The method of claim 1, further comprising:
  sending, to the vehicle, an instruction to modify one or more operating conditions of the vehicle based on the navigation score.

3. The method of claim 1, wherein the navigation score is determined based on a segment of a road associated with each maneuver of the plurality of potential maneuvers.

4. The method of claim 1, wherein the vehicle has a plurality of autonomous features activated, the method further comprising:
  receiving, by the computing device and from one or more of the vehicle or mobile device, data indicating that the vehicle is approaching the intersection; and
  in response to receiving the data indicating that the vehicle is approaching the intersection, sending, to the vehicle, an instruction to deactivate one or more of the plurality of autonomous features.

5. The method of claim 1, further comprising:
  determining, by the computing device, whether the vehicle is autonomous, wherein the selecting the maneuver comprises selecting a first maneuver if the vehicle is autonomous and selecting a second maneuver if the vehicle is not autonomous.

6. The method of claim 1, wherein the plurality of potential maneuvers at the intersection comprises at least two of a right turn at the intersection, a left turn at the intersection, a U turn at the intersection, and proceeding straight through the intersection.

7. The method of claim 1, further comprising:
  determining, by the computing device, an intersection score for the intersection based on one or more of a complexity of the intersection, a number of accidents at the intersection, weather, or traffic congestion.

8. An apparatus comprising:
  a processor; and
  memory storing computer-executable instructions that, when executed by the processor, cause the apparatus to:
    determine, for a vehicle, a navigation route comprising one or more intersections;
    determine a plurality of potential maneuvers at an intersection of the one or more intersections of the navigation route of the vehicle;
    determine, based on a level of autonomy of the vehicle, a navigation score for each of the plurality of potential maneuvers at the intersection;
    select, based on the navigation score for each of the plurality of potential maneuvers at the intersection, a maneuver; and
    transmit, via one or more wireless communications and to the vehicle, the maneuver.

9. The apparatus of claim 8, wherein the apparatus is at a location remote from a location of the vehicle, and wherein the memory stores computer-executable instructions that, when executed by the processor, cause the apparatus to:
  send, to the vehicle, an instruction to modify one or more operating conditions of the vehicle.

10. The apparatus of claim 8, wherein the computer-executable instructions cause the apparatus to determine the navigation score based on a segment of a road associated with each maneuver of the plurality of potential maneuvers.

11. The apparatus of claim 8, wherein the vehicle has a plurality of autonomous features activated, and wherein the memory stores computer-executable instructions that, when executed by the processor, cause the apparatus to:
  receive, from one or more of the vehicle or mobile device, data indicating that the vehicle is approaching the intersection; and
  in response to receiving the data indicating that the vehicle is approaching the intersection, send, to the vehicle, an instruction to deactivate one or more of the plurality of autonomous features.

12. The apparatus of claim 8, wherein the plurality of potential maneuvers at the intersection comprises at least two of a right turn at the intersection, a left turn at the intersection, a U turn at the intersection, and proceeding straight through the intersection.

13. The apparatus of claim 8, wherein the computer-executable instructions cause the apparatus to determine the navigation score based on one or more of an intersection preference, a maneuver preference, a speed preference, or a road-style preference.

14. The apparatus of claim 8, wherein the memory stores computer-executable instructions that, when executed by the processor, cause the apparatus to:
  determine an intersection score for the intersection based on one or more of a complexity of the intersection, a number of accidents at the intersection, weather, or traffic congestion.

15. A non-transitory computer readable medium storing instructions that, when read by a computing device, cause the computing device to:
- determine, for a vehicle, a navigation route comprising one or more intersections;
- determine a plurality of potential maneuvers at an intersection of the one or more intersections of the navigation route of the vehicle;
- determine, based on a level of autonomy of the vehicle, a navigation score for each of the plurality of potential maneuvers at the intersection;
- select, based on the navigation score for each of the plurality of potential maneuvers at the intersection, a maneuver; and
- send, via one or more wireless communications and to the vehicle, the maneuver.

16. The non-transitory computer readable medium of claim 15, wherein the non-transitory computer readable medium stores instructions that, when read by the computing device, cause the computing device to:
- send, to the vehicle, an instruction to modify one or more operating conditions of the vehicle.

17. The non-transitory computer readable medium of claim 15, wherein the instructions cause the computing device to determine the navigation score based on a segment of a road associated with each maneuver of the plurality of potential maneuvers.

18. The non-transitory computer readable medium of claim 15, wherein the vehicle has a plurality of autonomous features activated, wherein the non-transitory computer readable medium stores instructions that, when read by the computing device, cause the computing device to:
- receive, from one or more of the vehicle or mobile device, data indicating that the vehicle is approaching the intersection; and
- in response to receiving the data indicating that the vehicle is approaching the intersection, send, to the vehicle, an instruction to deactivate one or more of the plurality of autonomous features.

19. The non-transitory computer readable medium of claim 15, wherein the plurality of potential maneuvers at the intersection comprises at least two of a right turn at the intersection, a left turn at the intersection, a U turn at the intersection, and proceeding straight through the intersection.

20. The non-transitory computer readable medium of claim 15, wherein the instructions cause the computing device to determine the navigation score based on one or more of an intersection preference, a maneuver preference, a speed preference, or a road-style preference.

* * * * *